United States Patent
Fox et al.

(10) Patent No.: US 8,156,227 B2
(45) Date of Patent: *Apr. 10, 2012

(54) SYSTEM AND METHOD FOR MANAGING MULTIPLE DOMAIN NAMES FOR A WEBSITE IN A WEBSITE INDEXING SYSTEM

(75) Inventors: Vanessa Fox, Redmond, WA (US); Matthew D. Cutts, Mountain View, CA (US); Maxmilian Ibel, Pfaeffikon (CH); Michael E. Noth, Bothell, WA (US); David Michael Proudfoot, Mountain View, CA (US); Andrey Yuryevich Stroilov, Kirkland, WA (US)

(73) Assignee: Google Inc, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/073,943

(22) Filed: Mar. 28, 2011

(65) Prior Publication Data

US 2011/0179178 A1    Jul. 21, 2011

Related U.S. Application Data

(63) Continuation of application No. 11/616,807, filed on Dec. 27, 2006, now Pat. No. 7,930,400.

(60) Provisional application No. 60/822,496, filed on Aug. 15, 2006, provisional application No. 60/821,560, filed on Aug. 4, 2006.

(51) Int. Cl.
    *G06F 15/16* (2006.01)
(52) U.S. Cl. .......................... 709/226; 709/224; 707/709
(58) Field of Classification Search .......... 709/200–203, 709/217–227, 228; 707/709

See application file for complete search history.

(56) References Cited

U.S. PATENT DOCUMENTS

| | | | |
|---|---|---|---|
| 5,935,210 A | 8/1999 | Stark | 709/224 |
| 5,958,008 A | 9/1999 | Pogrebisky et al. | 709/223 |
| 6,124,966 A | 9/2000 | Yokoyama | 359/339 |
| 6,144,959 A | 11/2000 | Anderson et al. | 707/9 |
| 6,269,370 B1 | 7/2001 | Kirsch | 707/10 |
| 6,271,840 B1 | 8/2001 | Finseth et al. | 345/349 |
| 6,285,999 B1 | 9/2001 | Page | 707/5 |
| 6,321,265 B1 | 11/2001 | Najork et al. | 709/224 |
| 6,418,433 B1 | 7/2002 | Chakrabarti et al. | 707/5 |
| 6,421,724 B1 | 7/2002 | Nickerson et al. | 709/224 |
| 6,424,966 B1 | 7/2002 | Meyerzon et al. | 707/3 |
| 6,516,337 B1 | 2/2003 | Tripp et al. | 709/202 |
| 6,525,748 B1 | 2/2003 | Belfiore et al. | 345/855 |
| 6,636,854 B2 | 10/2003 | Dutta et al. | 707/10 |
| 6,732,105 B1 | 5/2004 | Watson et al. | 1/1 |
| 6,957,383 B1 | 10/2005 | Smith | 715/501 |
| 6,976,053 B1 | 12/2005 | Tripp et al. | 709/202 |

(Continued)

OTHER PUBLICATIONS

Clabo, S., Hermetic Sitemap Builder, A Search Engine Submission and Website Development Tool, http://www.hermetic.ch/smb/smb.htm, Jan. 7, 2010, 3 pages.

(Continued)

*Primary Examiner* — Moustafa M Meky
(74) *Attorney, Agent, or Firm* — Morgan, Lewis & Bockius LLP

(57) ABSTRACT

When a website has a number of equivalent domain names including a preferred domain name, the locator for a document in the website can be rewritten using the preferred domain name before indexing the document, according to certain embodiments. According to certain embodiments, a user interface is provided to allow a user to specify the preferred domain name for a website for which the user is a verified owner.

26 Claims, 23 Drawing Sheets

U.S. PATENT DOCUMENTS

| | | | |
|---|---|---|---|
| 6,983,282 B2 | 1/2006 | Stern et al. | 707/102 |
| 7,133,870 B1 | 11/2006 | Tripp et al. | 707/10 |
| 7,139,747 B1 | 11/2006 | Najork | 707/3 |
| 7,191,210 B2 | 3/2007 | Grossman | 709/203 |
| 7,774,782 B1 | 8/2010 | Popescu et al. | 718/104 |
| 7,844,610 B2 | 11/2010 | Hillis et al. | 707/740 |
| 2002/0032772 A1 | 3/2002 | Olstad et al. | 709/224 |
| 2002/0052928 A1 | 5/2002 | Stern et al. | 709/218 |
| 2002/0061029 A1 | 5/2002 | Dillon | 370/432 |
| 2002/0087515 A1 | 7/2002 | Swannack et al. | 707/2 |
| 2002/0138582 A1 | 9/2002 | Chandra et al. | 709/206 |
| 2003/0028896 A1 | 2/2003 | Swart et al. | 725/127 |
| 2004/0030683 A1 | 2/2004 | Evans et al. | 707/3 |
| 2004/0093327 A1 | 5/2004 | Anderson et al. | 707/3 |
| 2004/0122686 A1 | 6/2004 | Hill et al. | 705/1 |
| 2004/0158617 A1 | 8/2004 | Shanny et al. | 709/217 |
| 2004/0168066 A1 | 8/2004 | Alden | 713/182 |
| 2004/0221289 A1 | 11/2004 | D'Souza et al. | 718/102 |
| 2005/0060286 A1 | 3/2005 | Hansen et al. | 707/2 |
| 2005/0256865 A1 | 11/2005 | Ma et al. | 707/5 |
| 2006/0004691 A1 | 1/2006 | Sifry | 707/1 |
| 2006/0070022 A1 | 3/2006 | Ng et al. | 717/104 |
| 2006/0080405 A1 | 4/2006 | Gibson | 709/218 |
| 2006/0106866 A1 | 5/2006 | Green et al. | 707/104.1 |
| 2006/0212451 A1 | 9/2006 | Serdy, Jr. et al. | 707/10 |
| 2007/0011168 A1 | 1/2007 | Keohane et al. | 707/10 |
| 2008/0021904 A1 | 1/2008 | Garg et al. | 707/10 |

OTHER PUBLICATIONS

Microsoft Compute Dictionary, Fifth Edition, © 2002, 3 pages.

Sitemaps.org, "What are Sitemaps?," http://web.archive.org/web/20061205095241/http://sitemaps.org/, Nov. 16, 2006, 1 page.

XML-Sitemaps.com, "Build Your Site Map Online," http://www.xml-sitemaps.com, © 2005, 2 pages.

Yahoo! Adopts Site Maps (urllist.txt), "The Optimizer—Weekly SEO News," http://www.increased-online-traffic.com/2005/08/yahoo-adopts-site-maps-urllisttxt.asp, Aug. 23, 2005, 5 pages.

Yahoo! Free Sitemaps: Submit Your Site, http://www.seroundtable.com/archives/002421.html, Aug. 23, 2005, 2 pages.

Yahoo Search Blog, "Archive for the 'Site Explorer' Category," http://www.ysearchblog.com/category/site-explorer/page/2/, Dec. 6, 2005, Jun. 2, 2006 and Feb. 26, 2007, 11 pages.

Yahoo! Sitemap Feed Submission, Antezeta, Seo & Wab Analytics Consulting, http://www.antezeta.com/yahoo/site-map-feed.html, Feb. 26, 2010, 7 pages.

"Technorati: Ping Configurations," http://web.archive.org/web/20040829035832/www.technorati.com/de . . . , Aug. 2004.

"SOAP Meets RSS," http://blogs.law.harvard.edu/tech/soapMeetsRss, Jul. 17, 2003.

"The Open Archives Initiative Protocol for Metadata Harvesting," Ver. 2.0, http://www.openarchives.org/OAI/openarchivesprotocol.html, Jun. 14, 2002.

SiteMap Generator Control Parameters 104

| |
|---|
| SiteMap Base URL — 302 |
| File Path to URL mapping(s) — 304 |
| URL exclusion pattern(s) — 306 |
| URL pattern(s) w/update rates — 308 |
| Notify URL(s) — 310 |
| Pointer(s) to URL List(s) — 312 |
| Pointer(s) to URL access log(s) — 314 |
| Pointer(s) to directory or directories — 316 |
| Preferred crawl time (optional) — 318 |
| • • • |

Figure 3

Site Owner Verification GUI 2000

Manage Site Ownership Verification

✓ Your website has been re-verified. Any site owners for whom we did not find a corresponding verification file or meta tag are no longer verified. Any site owners for whom we found a corresponding verification file or meta tag remain verified.

Use this page to re-verify all currently verified owners of this website

Ensure that the following verification file or meta tag exists for your account:
Your verification file: google5efa9b0ae8a8a04.html
Your verification meta tag: oEypY0ghjasdf=

The following verification files and meta tags may exist for your website. Remove any verification files or meta tags that are no longer valid
http://www.google.com/
http://www.google.com/webmaster/googlegoogle5efa9b0ae8a8a04.html
http://www.google.com/<meta="verify-v1"content="oEypY0ghjasdf=">

[ Re-verify website owners ]

2002
2004
2006
2008

Figure 20

SYSTEM AND METHOD FOR MANAGING MULTIPLE DOMAIN NAMES FOR A WEBSITE IN A WEBSITE INDEXING SYSTEM

RELATED APPLICATIONS

This application is a continuation of U.S. patent application Ser. No. 11/616,807, filed Dec. 27, 2006 now U.S. Pat. No. 7,930,400, which claimed priority and benefit under 35 U.S.C. 119(e) to U.S. Provisional Patent Application No. 60/822,496, titled, "System and Method for Managing Multiple Domain Names for a Website in a Website Indexing System," filed Aug. 15, 2006, and U.S. Provisional Patent Application No. 60/821,560, titled, "System and Method for Managing Multiple Domain Names for a Website in a Website Indexing System," filed Aug. 4, 2006, all of which are hereby incorporated by reference in their entirety.

This application is related to the following applications: (1) U.S. patent application Ser. No. 11/172,692, filed Jun. 30, 2005, entitled "Sitemap Generating Client for Web Crawler," and (2) U.S. patent application Ser. No. 11/172,764, filed Jun. 30, 2005, entitled "Web Crawler Scheduler that Utilizes Sitemaps from Websites," both of which are hereby incorporated by reference in their entirety.

TECHNICAL FIELD

The disclosed embodiments relate generally to search engines. More particularly, the disclosed embodiments relate to a management of domain names with respect to a website in a website indexing system.

BACKGROUND

A search engine is a tool that identifies documents, typically stored on hosts distributed over a network, which satisfy search queries specified by users. Web search engines work by storing information about a large number of documents (such as web pages) which they retrieve from the World Wide Web (WWW) via a web crawler. Such documents are downloaded by the web crawlers during crawling sessions for purposes of indexing. However, some websites may have several equivalent domain names. As a result, a respective document of a specified website that is associated with several equivalent domain names may be indexed based on several URLs that correspond to the various equivalent domain names. Thus, it may be advantageous to enable a website owner to designate a preferred domain name for a website that is associated with more than one domain name.

BRIEF DESCRIPTION OF THE DRAWINGS

FIG. 3 is a block diagram illustrating a data structure for storing sitemap generator control parameters, according to some embodiments of the invention.

FIGS. 19 and 20 are schematic illustrations of a GUI for managing site ownership verification, according to some embodiments.

Like reference numerals refer to corresponding parts throughout the drawings.

DESCRIPTION OF EMBODIMENTS

A web server of a website generates a sitemap of URLs (Universal Resource Locators) or URLs (Universal Resource Identifiers) that may be crawled by a web crawler. The sitemap may also include metadata associated with the URLs and/or URLs included in the sitemaps. The web server sends a notification to a remote computer associated with a web crawler. In this context the web server may be considered to be the client and the web crawler is considered to be the server in a client-server relationship. The remote computer accesses the sitemap and uses the information included within the sitemap to identify documents stored at the web server to include in a crawl.

In context of search engines and network crawlers, the term "crawl" means to download and process documents so as to build an index or other listing of documents. "A crawl" is an iteration of a crawl process, during which a set of documents are downloaded and processed. The term "crawl" sometimes also means identifying and processing links in the downloaded documents so as to build a link map or other representation of links between the crawled documents. Typically, the purpose of a crawl is to compile the information in a set of documents for a search engine, thereby enabling the search engine to identify documents satisfying search queries.

Figure 1:
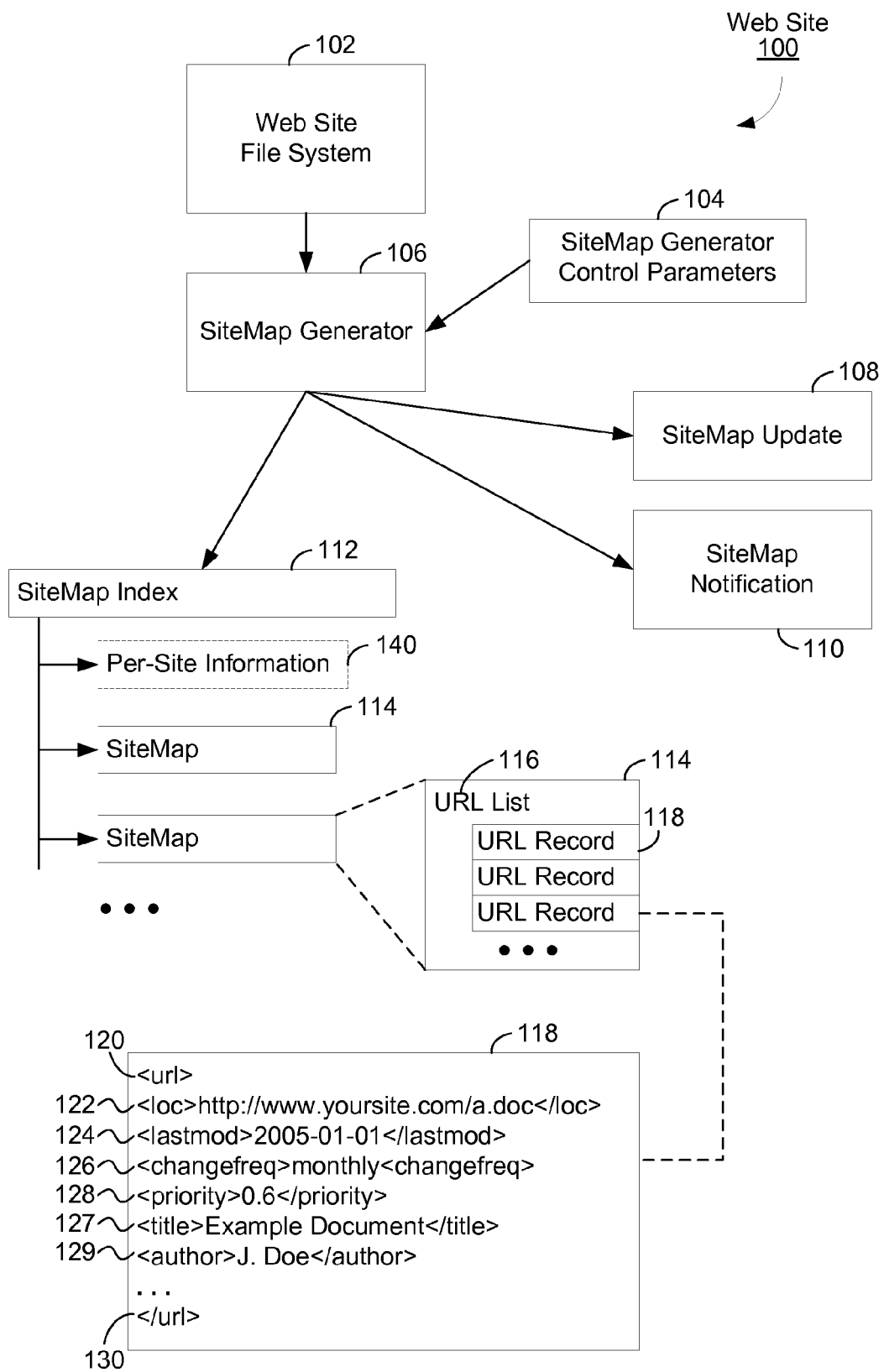
FIG. 1 is a conceptual diagram of a process for generating a sitemap for a website, according to some embodiments of the invention.

FIG. 1 is a block diagram illustrating a website 100, according to some embodiments of the invention. The website 100 includes a website file system 102, sitemap generator control parameters 104, a sitemap generator 106, a sitemap update module 108, a sitemap notification module 110, sitemaps 114, and sitemap indexes 112. The file system 102 may be implemented in some embodiments using any of a number of file systems, including distributed file systems in which files are stored on multiple computers. In other embodiments, the file system 102 may be implemented using a database or search engine that produces documents in response to queries. It should be appreciated, however, that FIG. 1 is intended more as functional description of the various features which may be present in a website than as a structural schematic of the embodiments described herein. In practice, and as recognized by those of ordinary skill in the art, items shown separately could be combined and some items could be separated. For example, some items shown separately in FIG. 1 could be implemented on single servers and single items could be implemented by one or more servers. As recognized by those of ordinary skill in the art, a website may be implemented on a single server, such as a web server, or on a plurality of servers, such as a plurality of web servers. The actual number of servers used to implement a website server and how features are allocated among them will vary from one implementation to another, and may depend in part on the amount of data traffic that the system must handle during peak usage periods as well as during average usage periods. For convenience of explanation, websites will be described below as if they are implemented on a single web server.

The website file system 102 organizes the documents that are stored at the web server. A document stored at the website may be any machine-readable file that includes text, graphics, video, audio, etc., or any combination thereof. Examples of documents that may be stored at a website include, without limitation, web pages, images, video files, audio files, Portable Document Format (PDF) files, plain text files, executable files, presentation files, spreadsheets, word processor documents, and so forth.

The documents stored at the website 100 may be organized in a hierarchal structure. That is, the documents are organized into a tree of nested directories, folders, or paths (hereinafter the "directory tree"). The directory tree includes a root directory/folder/path, and the root may have subdirectories/sub-folders/subpaths nested within. The subdirectories/sub-folders/subpaths may also have further subdirectories/sub-folders/subpaths nested within, thus forming a directory tree. Each document is stored in a directory/folder/path in the directory tree. Each directory/folder/path and each document is a node in the tree. The file system also stores metadata associated with the documents, such as a last modification date, a last access date, document permissions, and the like. In some embodiments, the file system may also include a database of documents and associated metadata. Documents in the database may be accessed by executing a query of the database as well as, or instead of, traversing the directory tree.

Each document stored at the website may be identified and/or located by a locator. In some embodiments, the locator is the Uniform Resource Locator (URL) of the document. In some other documents, alternative manners of identification (e.g., URIs) or addressing may be used. The URL of a document may be derived from its location in the file system. The URL of a document may be based on the directory/folder/path, or the location in a database, or on the query used to retrieve the document from the database in which the document is stored. That is, each document in a directory/folder/path or a database location may be mapped to an URL. In some embodiments, the URLs may be used by computers external to the website, such as remote computers associated with web crawlers, to access the documents in the file system that are open to external access. For convenience of explanation, the document locators are described below as if they are URLs.

The sitemap generator 106 generates sitemaps and, optionally, one or more sitemap indexes of the website. The sitemaps, further details of which are described below, may be used by web crawlers to schedule its crawls of documents stored at the web server. Sitemap indexes, further details of which are described below, encapsulate one or more sitemaps. The sitemap index may contain a list of sitemaps. The sitemap generator 106 generates sitemaps by accessing one or more sources of document information. In some embodiments, the sources of document information include the file system 102, access logs, pre-made URL lists, and content management systems. The sitemap generator may gather document information by simply accessing the website file system 102 and collecting information about any document found in the file system 102. For instance, the document information may be obtained from a directory structure that identifies all the files in the file system. The sitemap generator 106 may also gather document information by accessing the access logs (not shown) of the website. The access logs record accesses of documents by external computers. An access log may include the URLs of the accessed documents, identifiers of the computers accessing the documents, and the dates and times of the accesses. The sitemap generator 106 may also gather document information by accessing pre-made URL lists (not shown). The pre-made URL lists list URLs of documents that the website operator wishes to be crawled by web crawlers. The URL lists may be made by the website operator using the same format as that used for sitemaps, as described below.

If the documents in the website are managed via a content management system, the sitemap generator 106 may gather document information by interfacing with the content management system and accessing the information stored within the content management system. Content management systems are well known in the art and need not be further described.

The sitemap generator control parameters 104 include predefined parameters that control the generation of sitemaps. Further information regarding the sitemap generator control parameters 104 is described below, in relation to FIG. 3.

The sitemap generator 106 generates sitemaps 114 and possibly one or more sitemap indexes 112. The sitemap 114 and sitemap index 112 may be generated using any suitable format and language. In some embodiments, the sitemap is generated in Extensible Markup Language (XML) format, using predefined XML tags. In some other embodiments, other formats may be used, including but not limited to plain text files, comma-separated value files, and semicolon-separated value files. For convenience of description, sitemaps and sitemap indexes below are described as formatted using XML.

A sitemap index 112 is a document that lists one or more sitemaps 114. The sitemap generator 106, when generating sitemaps for the website, may generate multiple sitemaps, with each sitemap listing a subset of URLs of documents that may be crawled, rather than listing URLs of all documents that may be crawled in one sitemap. In such a situation, the sitemap generator 106 may also generate a sitemap index 112 to list the multiple sitemaps and their URLs. A sitemap index may include starting and ending tags (e.g., XML tags such as <sitemapindex> and </sitemapindex>, not shown in the Figures) defining the beginning and end of the sitemap index 112. The sitemap index also includes URLs of each sitemap listed in the sitemap index. The sitemap index may also include optional metadata for respective sitemap URLs in the sitemap index. For instance, the metadata may include a last modification date of the respective sitemap. Each sitemap URL and any respective associated metadata are enclosed by starting and ending tags that define the beginning and end of a sitemap record 114 in the sitemap index 112.

In addition to the list of sitemaps, in some embodiments a sitemap index may optionally contain a list of site-specific information 140 (also called "per-site information") that applies to an entire website. For example, a sitemap index may contain a list of time intervals and a rate at which the crawler should crawl the respective website (e.g., <crawl_rate from=08:00UTC to=17:00UTC>medium</crawl_rate>

<crawl_rate from=17:00UTC to=8:00UTC>fast</crawl_rate>).

In other examples, a sitemap index contains geographic information identifying a geographic location associated with the website (e.g., <location>latitude, longitude</location>), and/or it may contain language information identifying one or more languages supported by or otherwise associated with the respective website (e.g., <language>German</language>). In some embodiments, per-site information may also be present in the sitemaps references in a sitemap index file. If both the sitemap index and a referenced sitemap contain per-site information for the same property (e.g., crawl rate), then the value specified in the sitemap overrides the value specified in the sitemap index. In other embodiments, per-site information may be specified in a sitemap index or sitemap using syntax other than the examples given here.

In one embodiment, the sitemap generator 106 of a website generates a new sitemap at regular intervals, such as daily or weekly. Each new sitemap generated, after a first (starting point) sitemap, only lists URLs that are new or modified since the prior sitemap was generated (i.e., have a creation date or modification date after the date that the last sitemap was generated). The term "date" is used here to mean date and time, and may be represented by a timestamp, such as an ISO 8601 compatible timestamp using UTC (coordinated universal time). In these embodiments, the sitemap index for the website lists all the sitemaps generated for the website. Optionally, a new starting point sitemap may be generated by the sitemap generator at larger intervals (e.g., weekly or monthly) than the intervals at which the update sitemaps are generated. Each time a new sitemap is generated and added to the sitemap index, a notification is sent to one or more search engines or crawlers.

A sitemap 114 is a document that lists the URLs of documents in a website that may be crawled by a web crawler. A sitemap 114 includes a list of URLs and, optionally, additional information, such as metadata, for respective listed URLs. A sitemap 114 may include starting and ending tags 116 that define the beginning and end of the sitemap. The sitemap includes one or more URL records 118. The beginning and end of each URL record 118 are defined by a starting tag 120 and an ending tag 130. Each URL record 118 includes the URL 122 of a document that may be crawled. A URL record 118 may also include optional metadata associated with the respective URL. The optional metadata may include one or more of the following: a last modification date 124 of the document specified by the URL, a change frequency 126 (also called the update rate) of the document specified by the URL, a document title 127, a document author 129, and a priority 128 of the document specified by the URL. The change frequency 126 and priority 128 may be specified by the website operator.

The change frequency 126 is a descriptor of how often a document's content is expected to change. The descriptor is one of a predefined set of valid descriptors. In some embodiments, the set of change frequency descriptors includes "always," "hourly," "daily," "weekly," "monthly," "yearly," and "never." The change frequency 126 provides a hint to the crawler as to how often the document changes and the crawler can use the hint to schedule crawls of the document accordingly. A crawler, however, may crawl the document in a way that is inconsistent with the specified change frequency. For example, a crawler may crawl a document marked as "hourly" less frequently than a document marked as "yearly." The actual crawl frequency of a document may be based on the document's importance (as represented by a score, such as PageRank), actual observed changes in the document (or lack thereof) as observed by the crawler, and other factors, as well as the change frequency specified in a sitemap.

The priority 128 is a value that specifies the relative priority of the document identified by the URL 122. The priority 128 may be the priority relative to other documents listed in the same sitemap 114, relative to other documents stored in the same web server as the document, or relative to all documents in the website. In some embodiments, the range of priority values is 0.0 to 1.0, inclusive, with 0.5 as the default value, 0.0 as the lowest relative priority, and 1.0 as the highest relative priority. In some other embodiments, other priority scales, such as 0 to 10, may be used. The priority may be used by a crawler to determine which documents in the website should be crawled first. The crawler may ignore or modify the priority values in a sitemap when those priority values fail to meet predefined criteria (e.g., a requirement that the priority values in a sitemap or set of sitemaps for a website have a predefined average value, such as 0.5). In some embodiments, the priority may also be used when indexing documents.

The sitemap generator 106 may also interact with a sitemap update module 108 and a sitemap notification module 110. The sitemap notification module 110 sends a notification to a remote computer associated with a web crawler whenever a new or updated sitemap is available at the website. The notification includes the URL of the sitemap, so that the remote computer can access the sitemap. If the website uses sitemap indexes, the notification, in some embodiments, includes just the URL of the sitemap index. The remote computer accesses the sitemap index and identifies the URLs of the sitemaps from the sitemap index. In some other embodiments, the notification may include the actual sitemap index, in which case the remote computer need not access the sitemap index at the website.

The sitemap update module 108 may generate a differential sitemap based on a difference between a previously generated sitemap and a current sitemap. Further information regarding differential sitemaps is described below, in relation to FIG. 6.

Figure 2:
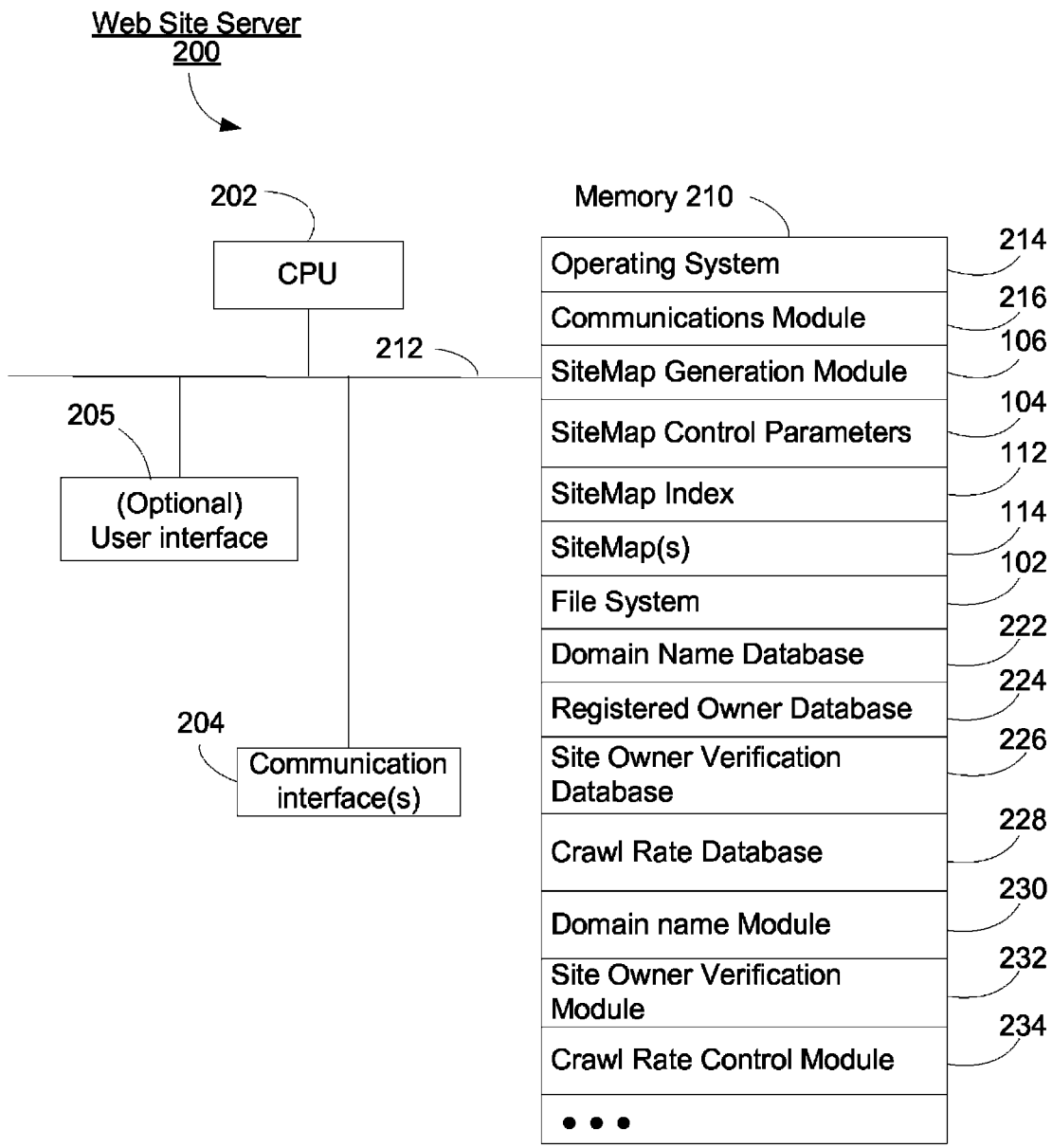
FIG. 2 is a block diagram illustrating a website server, according to some embodiments of the invention.
Figure 15:
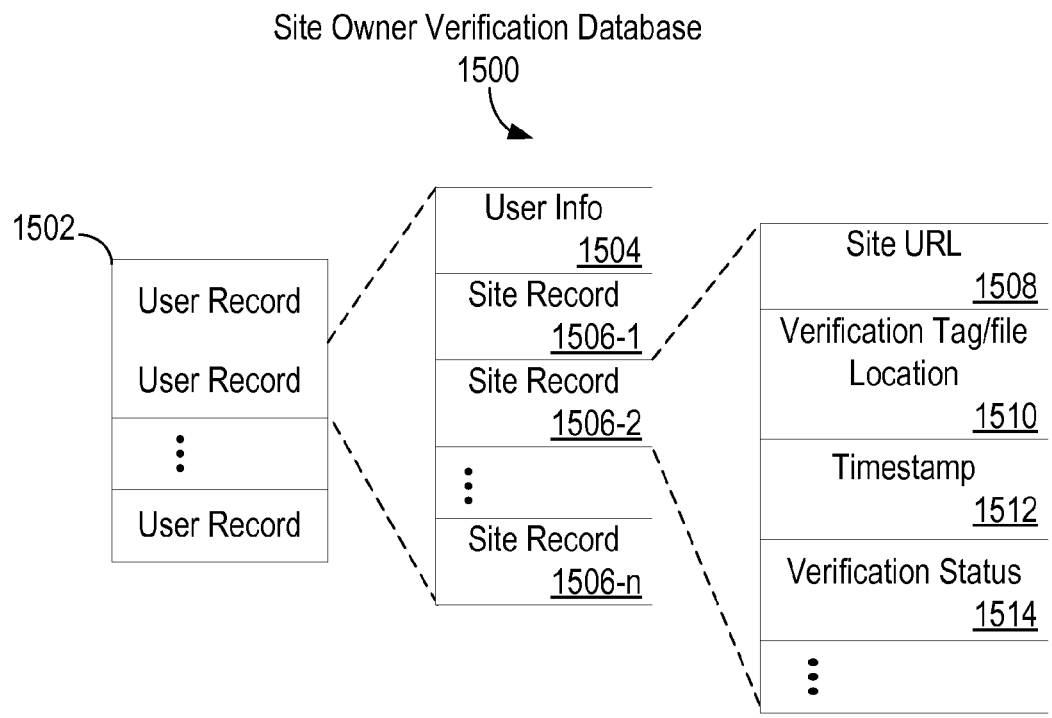
FIG. 15 is a block diagram illustrating a data structure in a registered owner database, according to some embodiments of the invention.
Figure 16:
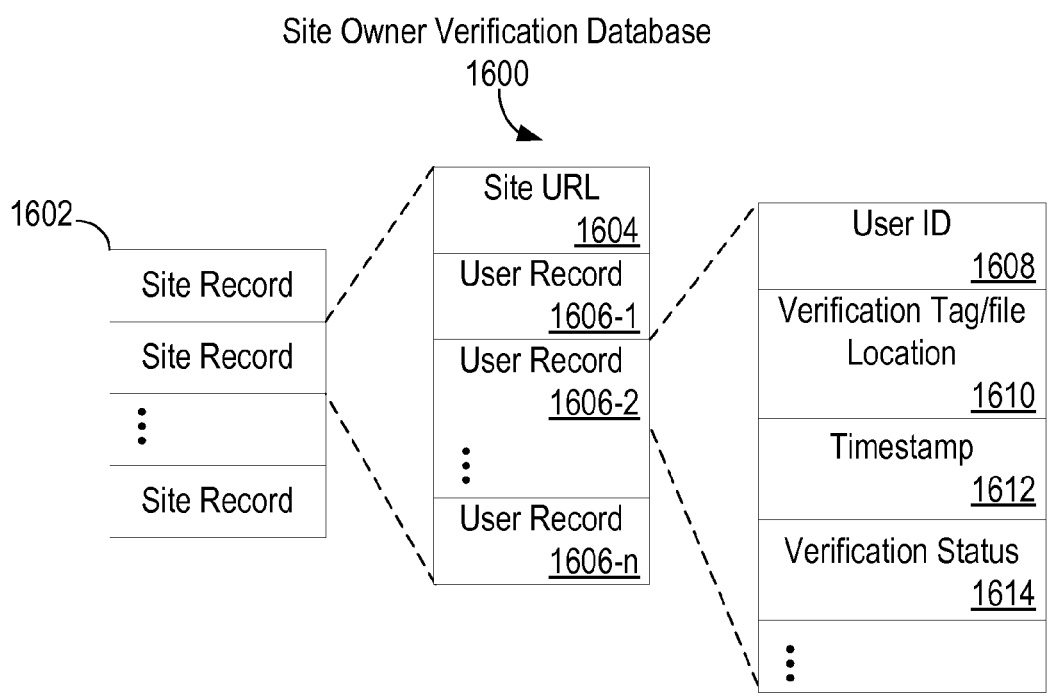
FIG. 16 is a block diagram illustrating an alternate data structure in a site owner verification database, according to some embodiments of the invention.
Figure 21:
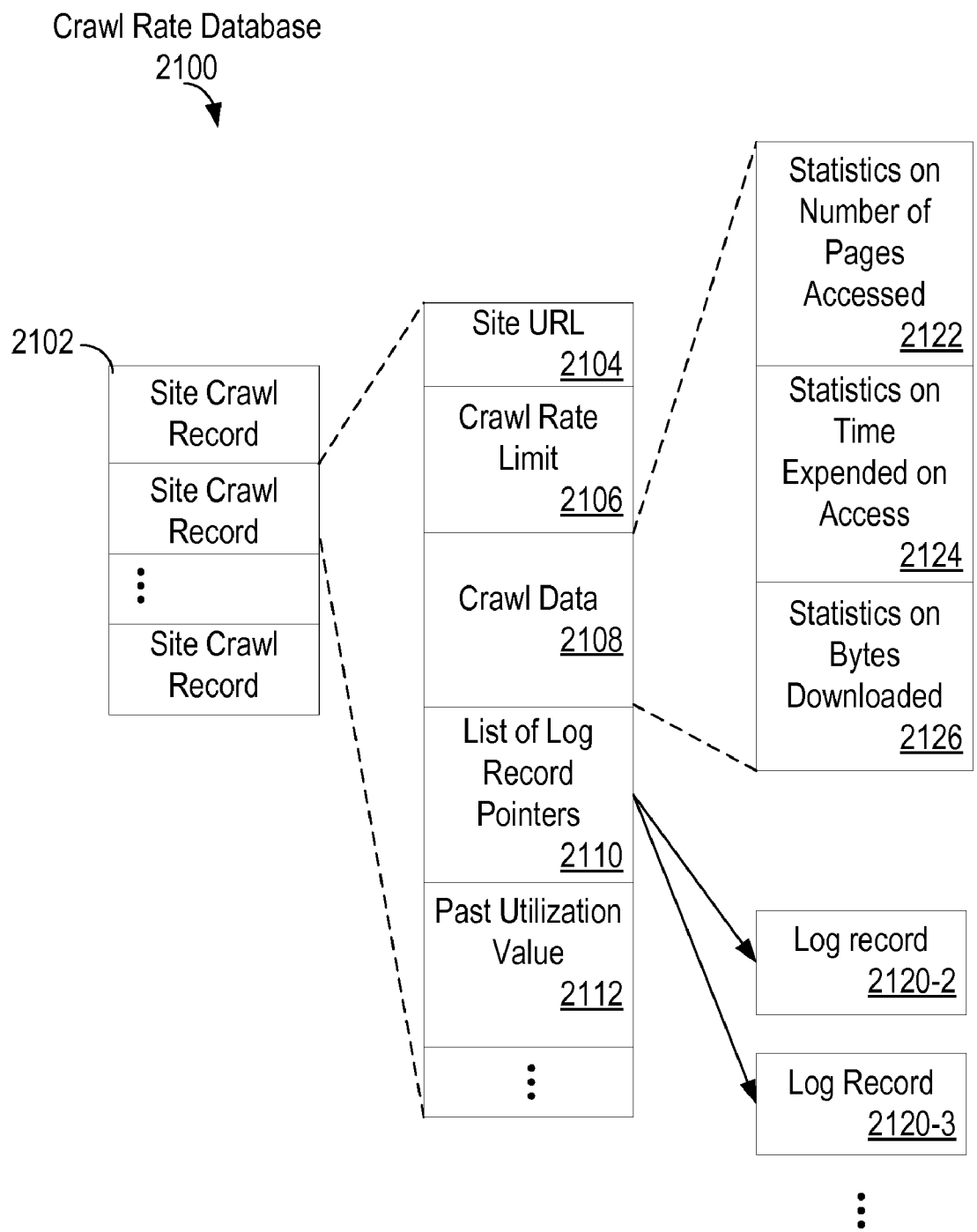
FIG. 21 is a block diagram illustrating a data structure in a crawl rate database, according to some embodiments.

FIG. 2 is a block diagram illustrating a website server 200, according to some embodiments of the invention. The website server 200 (or "web server") typically includes one or more processing units (CPU's) 202, one or more network or other communications interfaces 204, memory 210, and one or more communication buses or signal lines 212 for interconnecting these components. The website server 200 optionally may include a user interface 205, which may comprise a display device, mouse, and/or a keyboard. The memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202 (e.g., network attached storage). In some embodiments, the memory 210 stores the following programs, modules and data structures, or a subset thereof:

- an operating system 214 that includes procedures for handling various basic system services and for performing hardware dependent tasks;
- a network communication module 216 that is used for connecting the website server 200 to other computers via the one or more communication network interfaces 204 and one or more communication networks, such as the Internet, other wide area networks, local area networks, metropolitan area networks, and so on;
- a sitemap generation module 106 that generates sitemaps;
- sitemap control parameters 104 that control or guide sitemap generation;
- a sitemap index 112 that lists URLs of sitemaps stored at the website server 200;
- one or more sitemap(s) 114 that list URLs of documents that may be crawled;
- a website file system 102 that stores and organizes documents;
- a domain name database 222;
- a registered owner database 224;
- a site owner verification database 226, discussed below with reference to FIGS. 15-16;
- a crawl rate database 228, discussed below with reference to FIG. 21;
- a domain name module 230;
- a site owner verification module 232, discussed below with reference to FIGS. 17-20; and
- a crawl rate control module 234, discussed below with reference to FIGS. 21-25.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "website server," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a website server and how features are allocated among them will vary from one implementation to another, and may depend in part on the amount of data traffic that the system must handle during peak usage periods as well as during average usage periods.

FIG. 3 is a block diagram illustrating a data structure for storing sitemap generator control parameters, according to some embodiments of the invention. The sitemap generator control parameters 104 control the generation of sitemaps and sitemap indexes. Each of the parameters may be specified by the operator of the website. The parameters may include one or more of the following:

- one or more sitemap base URLs 302, which specifies the location(s) from which the sitemaps may be accessed by remote computers associated with web crawlers;
- file path to URL mapping(s) 304, which map directories/paths/folders or database locations in the file system 102 to externally accessible URLs (an exemplary path to URL mapping is P:/A/B/*.*>www.website.com/qu/*.*);
- URL exclusion pattern(s) 306, which specify classes of URLs that are to be excluded from inclusion in sitemaps (e.g., an exclusion pattern of "www.website.com/wa/*.pr1" would indicate that all "pr1" files in the "/wa" portion of www.website.com are to be excluded from the sitemap(s));
- URL pattern(s) with update rates 308, which specify classes of URLs and update rates (change frequencies) for respective URL classes (e.g., www.website.com/qu/a*.pdf> daily would indicate that the files meeting the specified patterns are expected to be updated daily.
- notify URL(s) 310, which specify the URLs of remote computers associated with web crawlers to which new sitemap notifications may be transmitted;
- pointer(s) to URL list(s) 312, which point to pre-made URL lists;
- pointer(s) to URL access log(s) 314, which point to URL access logs;
- pointer(s) to directory or directories 316, which point to directories/folders/paths or database locations in the file system 102; and
- (optional) preferred crawl time(s) 318, which specifies preferred times of the day for web crawlers to crawl the website. In some embodiments, blackout periods during which the web crawler should not crawl the website may be specified.

It should be appreciated that the parameters listed above are merely exemplary and that additional and/or alternative parameters may be included.

Figure 4:
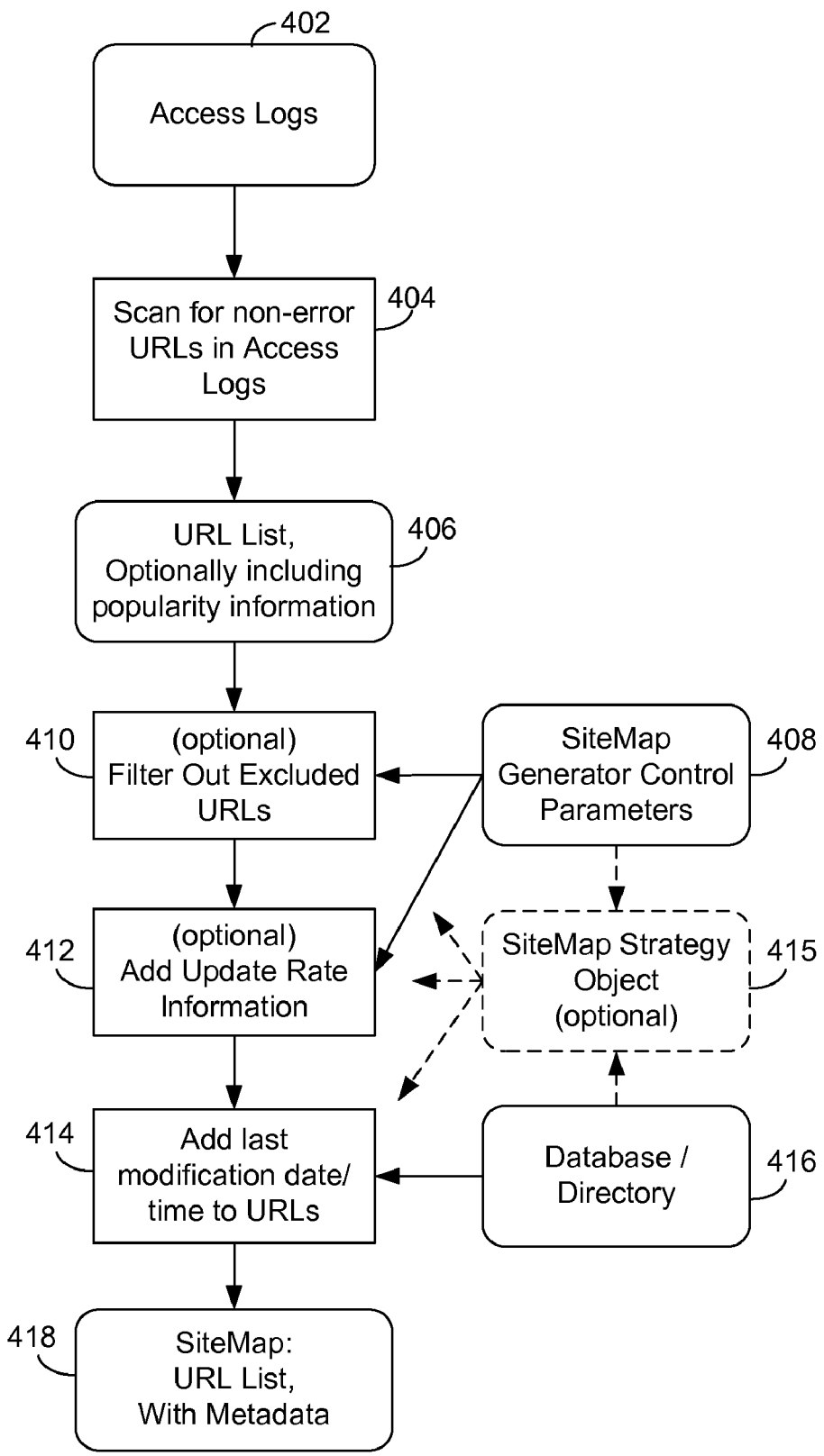
FIG. 4 is a flow chart illustrating a process for generating a sitemap, according to some embodiments of the invention.

FIG. 4 is a flow chart illustrating a process for generating a sitemap, according to some embodiments of the invention. As described above, a source of information about documents stored on the website is the access logs of the website. The access logs of the website are accessed (402). The access logs may be found by following pointers 314 to URL access logs. The access logs are scanned for non-error URLs (404). Non-error URLs are URLs that properly specify an existing and accessible document. Thus, for example, a URL for a document that is no longer on the website may be deemed an error URL. A list of URLs is generated (406). The list includes the non-error URLs found in the access logs. The list optionally may also include document popularity information derived from the access logs. The document popularity information may be determined based on the numbers of accesses each non-error URL has. The document popularity information serves as an additional hint of which documents are to be given a higher priority during crawling (e.g., scheduled to be crawled first, or more likely to be crawled than lower priority documents), based on which documents are in high demand (i.e., are accessed more often).

After the list of URLs is generated, the list may optionally be filtered for excluded URLs (410). The URL exclusion patterns 406 from the sitemap generator control parameters 104 may be used as the filter that is applied to the list of URLs (408). Alternately, URL exclusion patterns may be obtained elsewhere, or permanently encoded in a customized sitemap generator for the website. URLs in the list that match any of the URL exclusion patterns are removed from the list.

Optional update rate information may be added to the list of URLs, for the respective URLs in the list (412). In some embodiments, the update rates may be obtained from the sitemap generator control parameters 104, or more particularly, the URL pattern(s) with update rates 308 (408).

Last modification dates and times for the respective URLs in the list of URLs are added (414). The last modification dates may be obtained from the file system, which may be a database and/or a directory tree 416, as described above.

In an alternate embodiment, a sitemap strategy object 415 controls the filtering operation 410, update rate information adding operation 412 and the last modification date adding operation 414, using information obtained from a database 416 and/or the sitemap generator control parameters 408. In some embodiments, the sitemap strategy object determines which URLs (or URIs) to filter and which attributes to add to specific URLs (or URIs) by performing a database query on the underlying database 416.

The sitemap is generated from the resulting list of URLs, including any last modification date/time information, optional popularity information, and optional update rate information that has been included or obtained for the listed URLs (418). Within the sitemap, the metadata for the URLs listed in the sitemap comprises the last modification date/time information, optional popularity information, and optional update rate.

Figure 5:
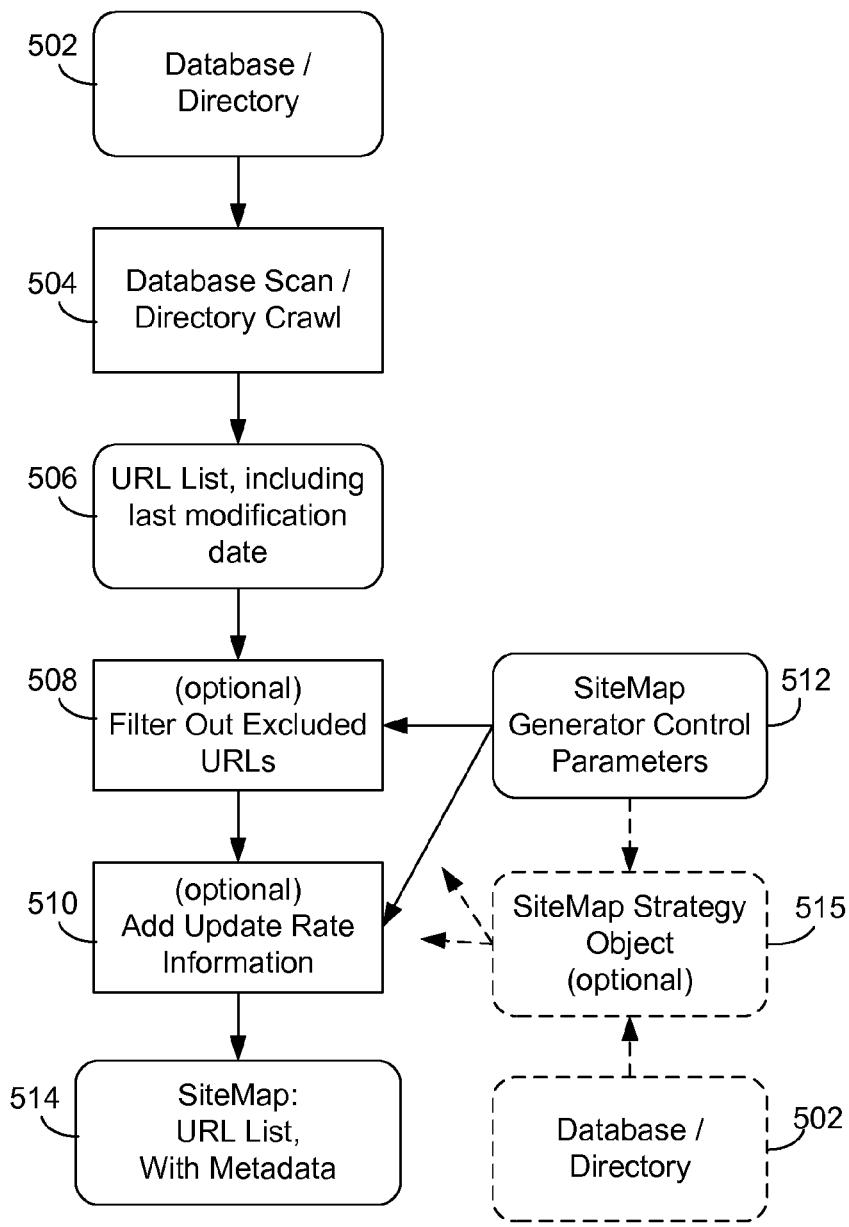
FIG. 5 is a flow chart illustrating another process for generating a sitemap, according to some embodiments of the invention.

FIG. 5 is a flow chart illustrating another process for generating a sitemap, according to some embodiments of the invention. The process of FIG. 5 is similar to that of FIG. 4, with the difference being that, in the process of FIG. 5, the initial source of document information is the file system database or directory tree (502), rather than access logs. A scan of the database or a traversal of the directory tree is performed (504). From the database scan or directory tree traversal, a list of URLs and associated last modification dates are obtained (506). The list may be optionally filtered for excluded URLs (508), using the URL exclusion patterns from the sitemap generator control parameters as the filters (512). Optionally, additional metadata, such as document update rate information associated with the respective URLs in the list of URLs may be added (510). The update rate information may be taken from the sitemap generator control parameters (512). The sitemap is generated from the list of non-excluded URLs, the last modification date information, and additional information such as the update rate information.

In an alternate embodiment, a sitemap strategy object 515 controls the filtering operation 508 and/or adding metadata 510 to the list of URLs or URIs in the sitemap 514 using information obtained from the underlying database 502 and/or the sitemap generator control parameters 512. In some embodiments, the sitemap strategy object 515 determines which URLs (or URIs) to filter and which attributes to add to specific URLs (or URIs) by performing a database query on the underlying database 502.

It should be appreciated that the sitemap generation processes illustrated in FIGS. 4 and 5 may be adapted to use alternative sources of document information and/or use multiple sources of document information. For example, the sitemap generator may initially extract URLs from one or more pre-made URL lists or from a content management system associated with the website. Regardless of the source from which the URLs are extracted, the sitemap generator may collect document metadata from as many of the sources of document information as needed. For example, the sitemap generator may extract URLs from pre-made URL lists, obtain the last modification dates from the file system and obtain document popularity information from the access logs. Any suitable combination of sources of document information may be used to generate the sitemaps.

Figure 6:
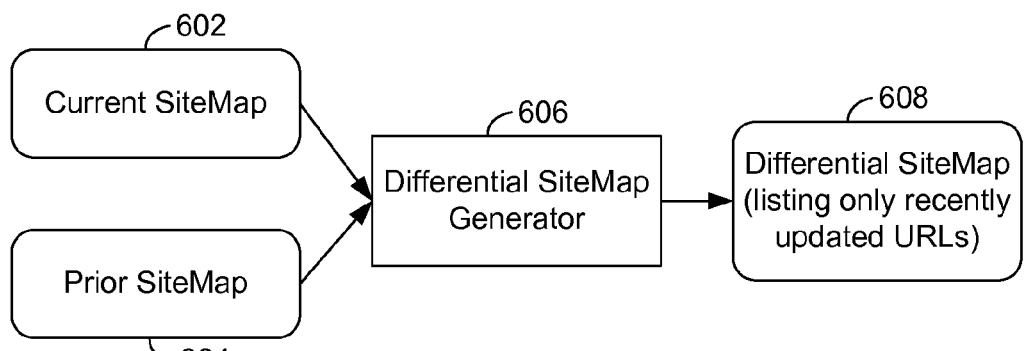
FIG. 6 is a flowchart illustrating a process for generating a differential sitemap, according to some embodiments of the invention.

FIG. 6 is a flowchart illustrating a process for generating a differential sitemap, according to some embodiments of the invention. A differential sitemap is a sitemap that is generated based on a difference between a previously generated sitemap and a current sitemap. The differential sitemap includes URLs that were not included in the previously generated sitemap and URLs that were included in the previously generated sitemap but which have new or updated metadata. For example, a URL with an updated last modification date would be included in the differential sitemap. The presence of an updated last modification date for the URL means that the document at the respective URL has been updated since the previously generated sitemap.

A current sitemap (602) and a previously generated sitemap (604) are processed by a differential sitemap generator, such as the sitemap update module 108 (606). The differences between the two sitemaps are ascertained and a differential sitemap is generated (608).

The sitemaps, if used by web crawlers, may lead to greater crawl coverage, since the sitemaps may include documents, such as documents that are accessible only by a database query, that are not accessible by following links. The sitemaps may also provide last modification dates. Web crawlers may use the last modification dates to determine if a document has changed, and may thereby avoid crawling documents whose contents have not changed. The use of sitemaps to avoid crawling unchanged documents can make web crawlers and network crawlers significantly more efficient. The sitemaps also include information from which web crawlers may determine which documents to crawl first and how much load to put on the web server during crawling. This, too, may help conserve network resources.

Figure 7:
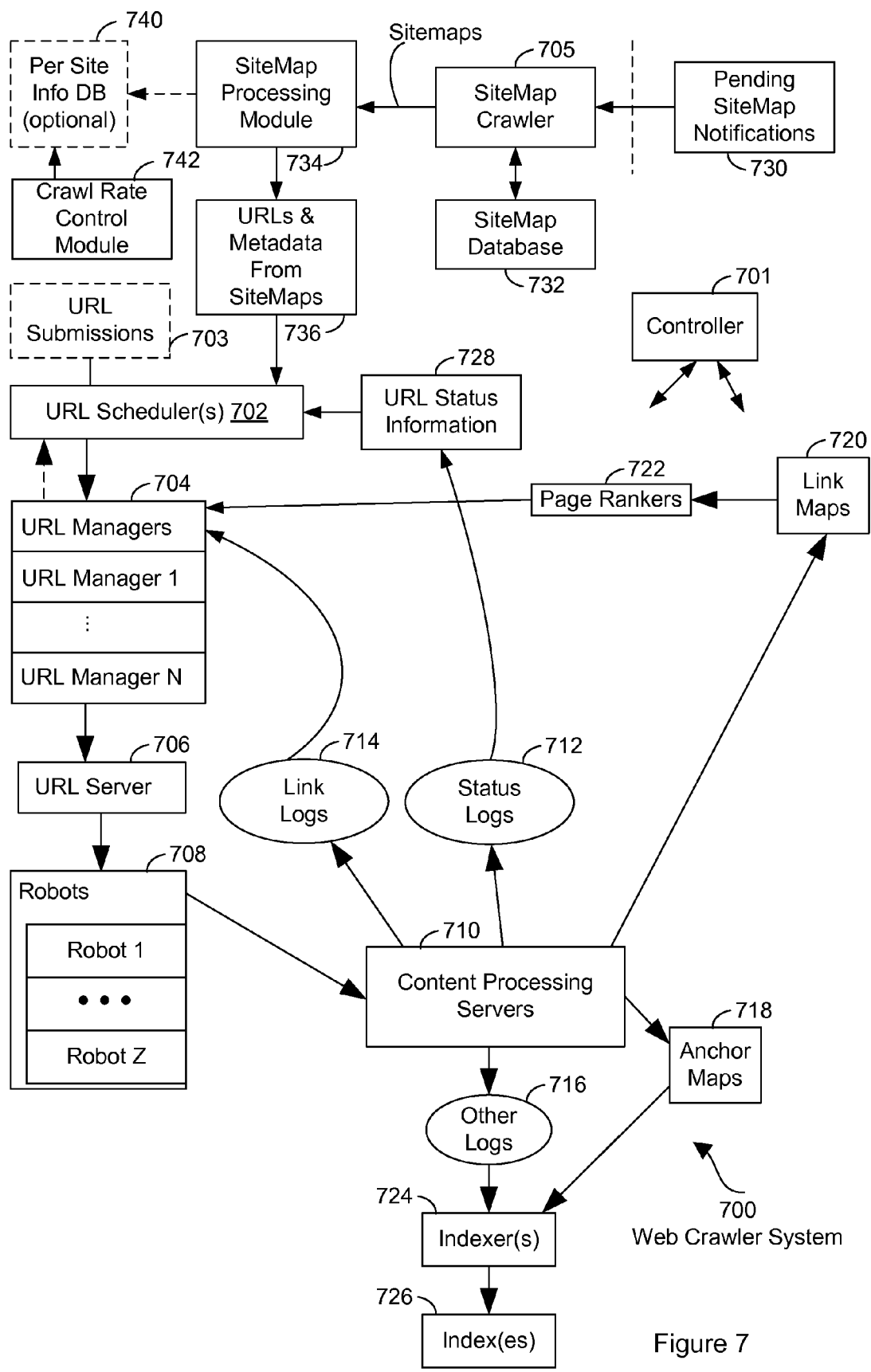
FIG. 7 is a block diagram illustrating a web crawler system, according to some embodiments of the invention.

FIG. 7 is a block diagram illustrating a web crawler system 700, according to some embodiments of the invention. The web crawler system 700, which may be a part of and/or associated with a search engine, crawls locations corresponding to documents stored in web servers. As discussed above, a document stored at the website may be any machine-readable file that includes text, graphics, video, audio, etc., or any combination thereof The sitemap crawler 705 accesses sitemaps generated by websites or web servers. The sitemap crawler 705 receives sitemap notifications. The sitemap notifications 730 are received from web servers or websites that have documents available for crawling. A notification from a web server or website informs the sitemap crawler that one or more sitemaps listing URLs of documents that may be crawled are available for access. The notification may include the URL of a sitemap, or the URLs of two or more sitemaps. The notification may include the URL of a sitemap index, or it may include the content of a sitemap index. In some embodiments, the notification may include the sitemap index (112, FIG. 1) or the full sitemap. The sitemap crawler 705 may access the sitemap index at the sitemap index URL to learn the URLs of the sitemaps and then access the sitemaps.

The sitemap crawler 705 accesses sitemaps from web servers or websites and may store copies of the accessed sitemaps in a sitemap database 732. The sitemap database 732 stores the sitemaps and information associated with the sitemaps, such as the web servers and/or websites with which the sitemaps are associated, the last modification dates of the sitemaps, and update rate information associated with the sitemaps.

Accessed sitemaps are provided to a sitemap processing module 734 for processing. The sitemap processing module 734 processes the sitemaps and identifies the URLs and associated metadata 736. The sitemaps are a source of URLs and associated metadata information for the URL scheduler 702. In some embodiments, an optional, additional source of URLs and associated metadata is direct submission 703 by users.

The URL scheduler 702 determines which URLs will be crawled in each crawling session. The URL scheduler 702 may store that information in one or more data structures (not shown), such as a set of list data structures. In some embodiments, the URL scheduler 702 allocates URLs to segments of the data structure, where the segments correspond to the crawl sessions. In these embodiments, the URL scheduler 702 also determines which URLs within each segment are to be crawled. In some embodiments, there may be a number of URL schedulers 702, which are run prior to each segment being crawled. Each scheduler 702 is coupled to a corresponding URL manager 704, which is responsible for managing the distribution of URLs to URL server 706. Alternately, each URL scheduler 702 may be coupled to two or more of the URL managers, enabling the URL distribution function for each crawl session to be spread over multiple URL managers. The URL schedulers 702 are adapted to receive URLs and metadata 736 extracted from sitemaps.

A controller 701 selects a segment for crawling. The selected segment is referred to hereinafter as the "active segment." Typically, at the start of each session, the controller 701 selects a different segment as the active segment so that, over the course of several sessions, all the segments are selected for crawling in a round-robin manner.

A query-independent score (also called a document score) is computed for each URL by URL page rankers 722. The page rankers 722 compute a page importance score (sometimes called a document importance score) for a given URL. In some embodiments, the page importance score is computed by considering not only the number of URLs that reference a given URL but also the page importance score of such referencing URLs. Page importance score data is provided to URL managers 704, which pass a page importance score for each URL to URL server 706, robots 708, and content processing servers 710. One example of a page importance score is PageRank, which is used the page importance metric used in the Google search engine. An explanation of the computation of PageRank is found in U.S. Pat. No. 6,285,999, which is incorporated by reference herein in its entirety as background information. In some embodiments, information from the sitemaps may be incorporated into the computation of the page importance score. An example of sitemap information that may be incorporated into the page importance score is the priority 128.

From time to time, the URL server 706 requests URLs from the URL managers 704. In response, the URL managers 704 provide the URL server 706 with URLs obtained from the data structure. The URL server 706 then distributes URLs from the URL managers 704 to crawlers 708 (hereinafter also called "robots" or "bots") to be crawled. A robot 708 is a server that retrieves documents at the URLs provided by the URL server 706. The robots 708 use various known protocols to download pages associated with URLs (e.g., HTTP, HTTPS, Gopher, FTP, etc.). According to certain embodiments, a crawl rate control module 742 sends crawl rate information for a specified website to the per-site information database 740. In some embodiments, a robot 708 retrieves, from the per-site information database 740 crawl rate and/or crawl interval information for a specified website, and then uses the retrieved information to control the rate at which pages associated with the URLs are accessed or downloaded by robot 708 from the website. In other embodiments, the URL server 706 retrieves the crawl rate information for a specified website from the per-site information database 740 and distributes the crawl rate information to one or more robots. According to certain embodiments, crawl rate may be controlled by a site owner as described in greater detail herein with reference to FIGS. 21-25.

Pages obtained from URLs that have been crawled by robots 708 are delivered to content processing servers 710, which perform a number of tasks. In some embodiments, these tasks include indexing the content of the pages, generating records of the outbound links in the pages, detecting duplicate pages, and creating various log records to record information about the crawled pages. In one embodiment, these log records are stored in log files, including link logs 714, status logs 712, and other logs 716. The link logs 714 include a link record for each document obtained from a URL by a robot 708 and passed to the content processing servers 710. Each link log 714 record identifies all the links (e.g., URLs, also called outbound links) that are found in the document associated with the record and the text that surrounds the link. The information in the link logs 714 is used by the content processing servers 710 to create link maps 720. The records in the link map 720 are similar to records in the link logs 714 with the exception that text is stripped and the records are keyed by a "fingerprint" of the normalized value of the source URL. In some embodiments, a URL fingerprint is a 64-bit integer determined by applying a hash function or other one way function to a URL. The bit-length of the URL fingerprint may be longer or shorter than 64 bits in other embodiments. The records in each link map 720 may optionally be sorted or keyed by a fingerprint. The link maps 720 are used by the page rankers 722 to compute or adjust the page importance score of URLs. In some embodiments, such page importance scores may persist between sessions.

The status logs 712 log the status of the document processing performed by the content processing servers 710. The status logs may include URL status information 728 (e.g., whether a document existed at the specified URL, last modification date information, and update rate information). The URL status information may be transmitted to the URL scheduler(s) 702. The URL scheduler(s) may use the URL status information to schedule documents for crawling.

In some embodiments, the content processing servers 710 also create anchor maps 718. The anchor maps 718 maps the "anchor text" in hyperlinks to the URL of the target URLs of the hyperlinks. In documents that use HTML tags to implement the hyperlinks, the anchor text is the text located between a pair of anchor tags. For example, the anchor text in the following pair of anchor tags is "Picture of Mount Everest":

<A href="http://www.website.com/wa/me.jpg">Picture of Mount Everest</A>.

In some embodiments, sitemap-supplied document metadata may also be used for creating anchor maps. For example, document metadata such as the document title 127 (FIG. 1), document author 129, or document description (not shown) may be used to create the anchor maps. However, it should be appreciated that any field appearing in a sitemap may be included in an anchor map.

In some embodiments, the records in an anchor map 718 are keyed by the fingerprints of outbound URLs present in link log 714. Thus, each record in an anchor map 718 comprises the fingerprint of an outbound URL and the anchor text that corresponds to the URL in link log 714. Anchor maps 718 are used by the indexer(s) 724 to facilitate the indexing of "anchor text" as well as to facilitate the indexing of URLs that do not contain words. For example, consider the case in which the target document at an outbound URL (e.g., the URL in the above example) is a picture of Mount Everest and there are no words in the target document. However, anchor text associated with the URL, "Picture of Mount Everest" is included in an index 726, sometimes called an inverse document index, thereby making the target document accessible via a search engine using the index 726.

The anchor maps 718 and other logs 716 are transmitted to indexer(s) 724. The indexer(s) 724 use the anchor maps 718 and other logs 716 to generate index(es) 726. The index(es) are used by the search engine to identify documents matching queries entered by users of the search engine.

Figure 8:
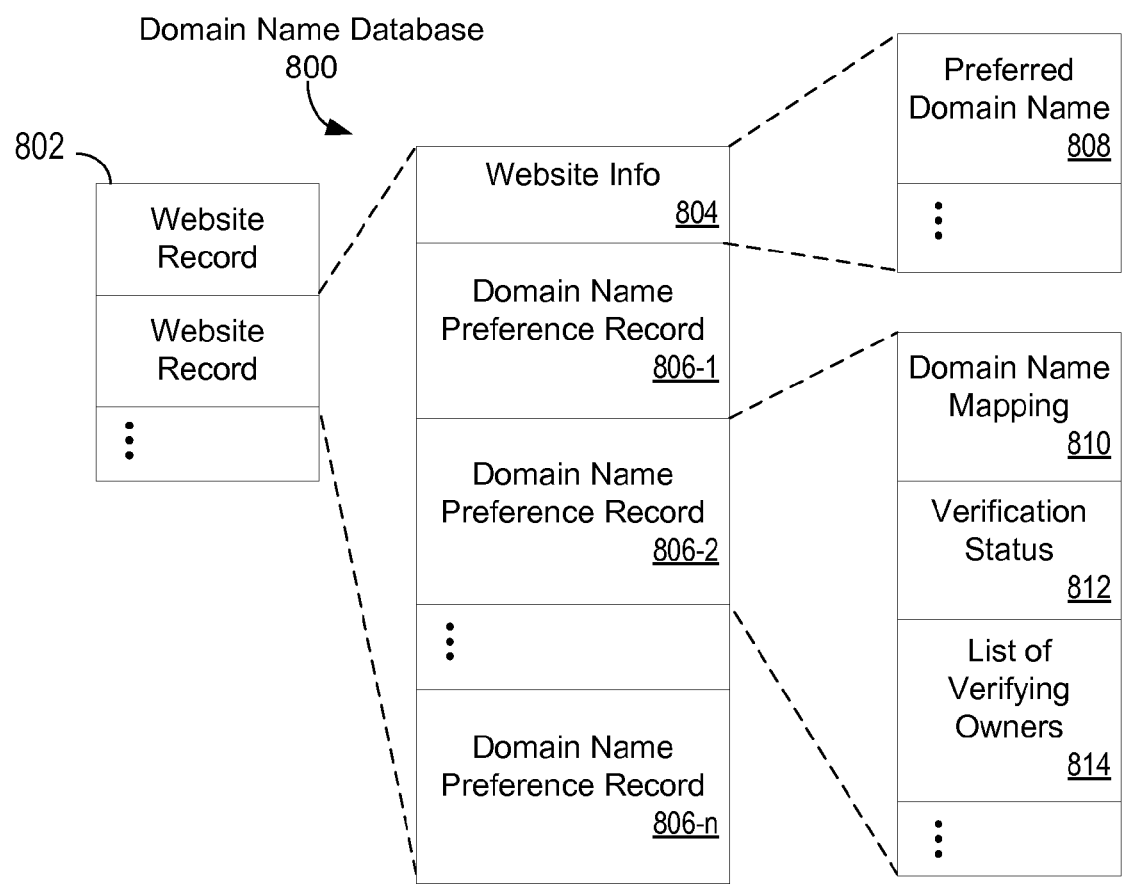
FIG. 8 is a block diagram illustrating a data structure in a domain name database, according to some embodiments of the invention.

FIG. 8 is a block diagram illustrating a domain name database 800 according to some embodiments of the invention. Domain name database 800 includes one or more website records 802, each of which stores domain name information (and possibly other information as well) for a respective website. All the verified domain names associated with a respective website are considered to be equivalent domain names in that any of the verified domain names can be used as the domain name portion of a webpage address or URL for addressing any webpage of the website. The website owner or manager, however, may prefer that a search engine index all pages of the website using a single, preferred domain name, even though links (to webpages in the website) in various webpages or other documents may use other ones of the website's verified domain names.

A respective website record 802 includes website information 804 and one or more domain name preference records 806. Website information 804 includes a preferred domain name 808 and optionally, additional information. A respective domain name preference record 806 includes a domain name mapping 810, a verification status 812, a list of verifying owners 814, and optionally, additional information. Preferred domain name 808 is the current preferred domain name for the website corresponding to the website record 802 in which the preferred domain name is stored. Each domain name mapping 810 identifies or specifies a respective domain name that is mapped to the preferred domain name. The list of verifying owners 814 identifies the one or more verified owners who have provided or confirmed the mapping shown in domain name mapping 810. As a non-limiting example, assume that A, B, C and X are equivalent domain names for a website. Further assume, the selected preferred domain name is X. Domain name mapping 810 of domain name preference record 806-1 may show the mapping of A→X. Similarly, domain name mapping 810 of domain name preference record 806-2 may show the mapping of B→X, etc. If at least one verifying owner from the list of verifying owners 814 is currently verified, then verification status 812 shows that the domain name mapping 810 is verified as valid. If no verifying owner from the list of verifying owners 814 is currently verified, then verification status 812 shows that the domain name mapping 810 is not verified and is invalid. Further, according to certain embodiments, a determination is made as to whether the domain name mapping that is provided by the one or more verified owners is an appropriate mapping. For example, it is determined whether the content at the respective websites associated with the equivalent domain names as specified by the mapping are identical. As another non-limiting example, a determination may be made as to whether a "301 redirect" or a "302 redirect" has been set up for web pages from one domain name to an equivalent domain name as defined in the domain name mapping. According to certain embodiments, the system that implements or maintains the domain name database 800 ensures that the domain name mappings do not contain cycles and/or chains. For example, the mappings A→X, X→Y are not allowed to coexist. Mappings such as A→X, X→Y, Y→A are also not allowed to coexist. However, according to certain other embodiments, the domain name mappings can contain chains, but not cycles.

Figure 9:
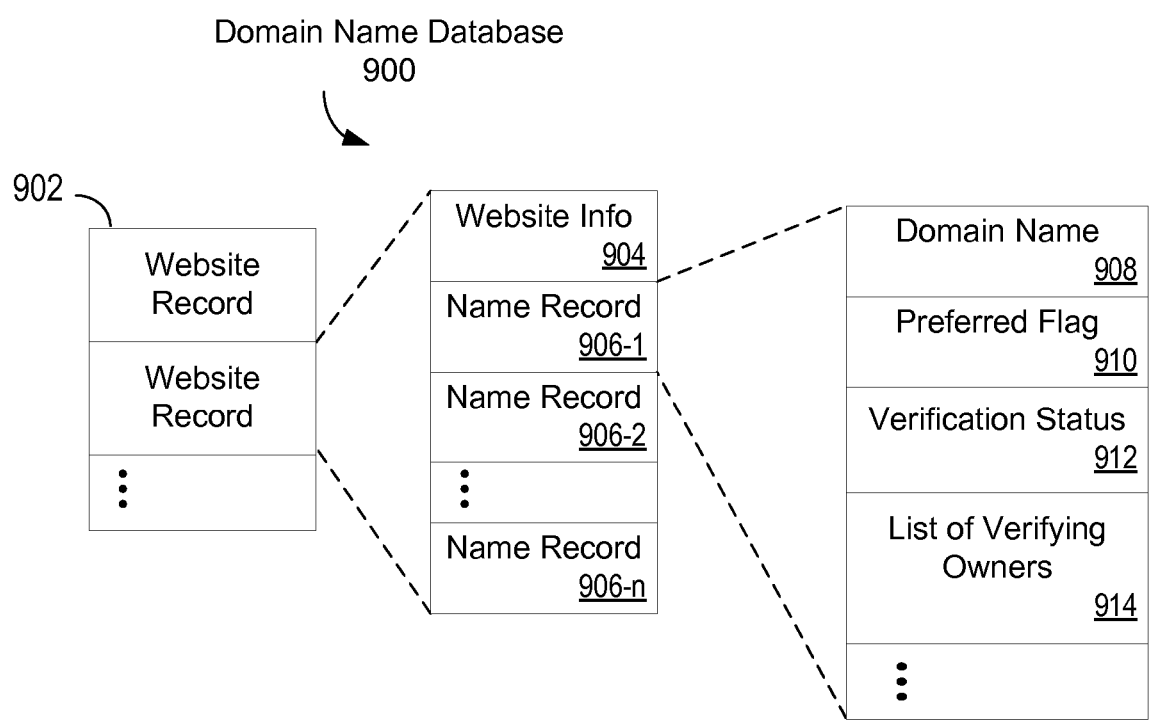
FIG. 9 is a block diagram illustrating an alternate data structure in a domain name database, according to some embodiments of the invention.

FIG. 9 is a block diagram illustrating an alternate data structure for a domain name database 900, according to some embodiments of the invention. The domain name database 900 includes one or more website records 902. Website record 902 includes website information 904 and one or more name records 906 that correspond to one or more equivalent domain names for a given website. A respective name record 906 includes a domain name or domain name identifier 908, a preferred flag 910, a verification status 912, a list of verifying owners 914, and optionally, additional information. If the preferred flag 910 is set for a given domain name, then that domain name is the preferred domain name for the website corresponding to the website record 902 in which the preferred flag 910 is stored. The list of verifying owners 914 shows the list of verified owners that have identified or confirmed the domain name 908 as the preferred domain name. If at least one verifying owner from the list of verifying owners 914 is currently verified, then verification status 912 shows that the domain name 908 is a currently verified domain name for the website. If no verifying owner from the list of verifying owners 914 is currently verified, then verification status 912 shows that the domain name 908 does not qualify as a verified domain name for the website.

According to certain embodiments, a website owner can select a preferred domain name for indexing documents of his or her website. For purposes of explanation, assume that a website has two URLs that point to the same document on the website. The two URLs may be www.domain.com/p1.html and domain.com/p1.html. A search engine may not assume that www.domain.com/p1.html and domain.com/p1.html point to the same document. Further, even if the search engine determines that www.domain.com/p1.html and domain.com/p1.html point to the same document, the search engine does not know which domain name is preferred by the website owner for indexing the document of the website. As another non-limiting example, a website may use several equivalent domain names in the URLs associated with the website. For example, domain1.com, domain2.com, and shortcutdomain.com may all be equivalent to domain.com. In other words, the URLs domain1.com/P1.html, domain2.com/P1.html, shortcutdomain.com/P1.html and domain.com/P1.html all point to the same document (document P1.html) in the website. In this example, document P1.html represents any document in the website. During indexing of documents of such a website, a search engine may index document P1 as if it were several documents. Thus, the ranking value (and/or other metadata) of document P1 is diluted. Further, if the search engine had knowledge that the URLs domain1.com/P1.html, domain2.com/P1.html, shortcutdomain.com P1.html and domain.com/P1.html point to the same document, and that domain.com is the preferred domain name, the URLs domain1.com/P1.html, domain2.com/P1.html, shortcutdomain.com/P1.html can be rewritten to domain.com/P1.html before commencing crawling of the website. As a consequence, the search engine crawls fewer documents and significant bandwidth savings may be realized.

According to certain embodiments, a mechanism may be provided to enable a website owner to specify a preferred domain name. Some non-limiting examples of such a mechanism include a user interface, meta-tags and a file stored in the website and having a predefined name (e.g., robots.txt) to enable the website owner to specify a preferred domain name. As another non-limiting example, a predetermined protocol may be used to specify the preferred domain name. As another feature of some embodiments, the website owner may change the preferred domain name at any time. According to certain embodiments, the user specifying the preferred domain name is verified as a valid website owner. Instructions to use a domain name selected by a verified website owner as the preferred domain name may receive more weight than similar instructions from a non-verified user, according to some embodiments.

Figure 10:
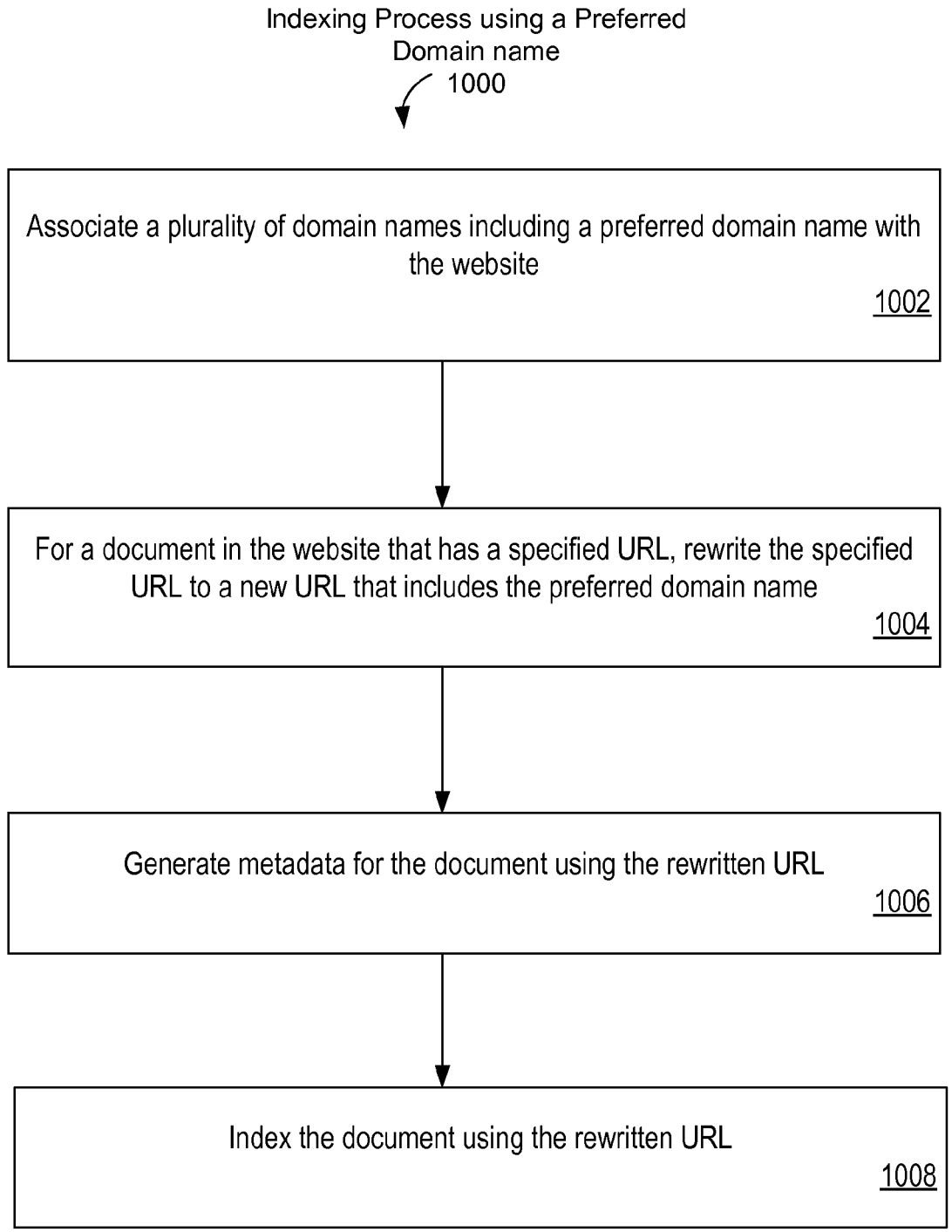
FIG. 10 is a flowchart illustrating a process for using a preferred domain name when indexing documents, according to some embodiments of the invention.

FIG. 10 is a flowchart illustrating a process for using a preferred domain name when indexing documents, according to some embodiments of the invention. A plurality of domain names including a preferred domain name is associated with a given website (1002). For a document in the website that has a specified URL, the specified URL is rewritten to a new URL that includes the preferred domain name (1004). For example, during a web crawl by a search engine's web crawler, the URL in a link (found in a previously crawled document) is rewritten to a new URL, thereby replacing the domain name of the URL from a first domain name to the preferred domain name of a respective website. Metadata for the document is generated using the re-written URL (1006). A non-limiting example of metadata for the document is page rank (sometimes written as "PageRank"). In addition, the document is indexed using the rewritten URL (1008). In some embodiments, indexing the document produces entries in the inverse index of a search engine. The inverse index's entries corresponding to the indexed document reference the rewritten URL. As a result, when the search engine returns a search result that includes the document, the URL of the document in the search result is the rewritten URL.

Figure 11:
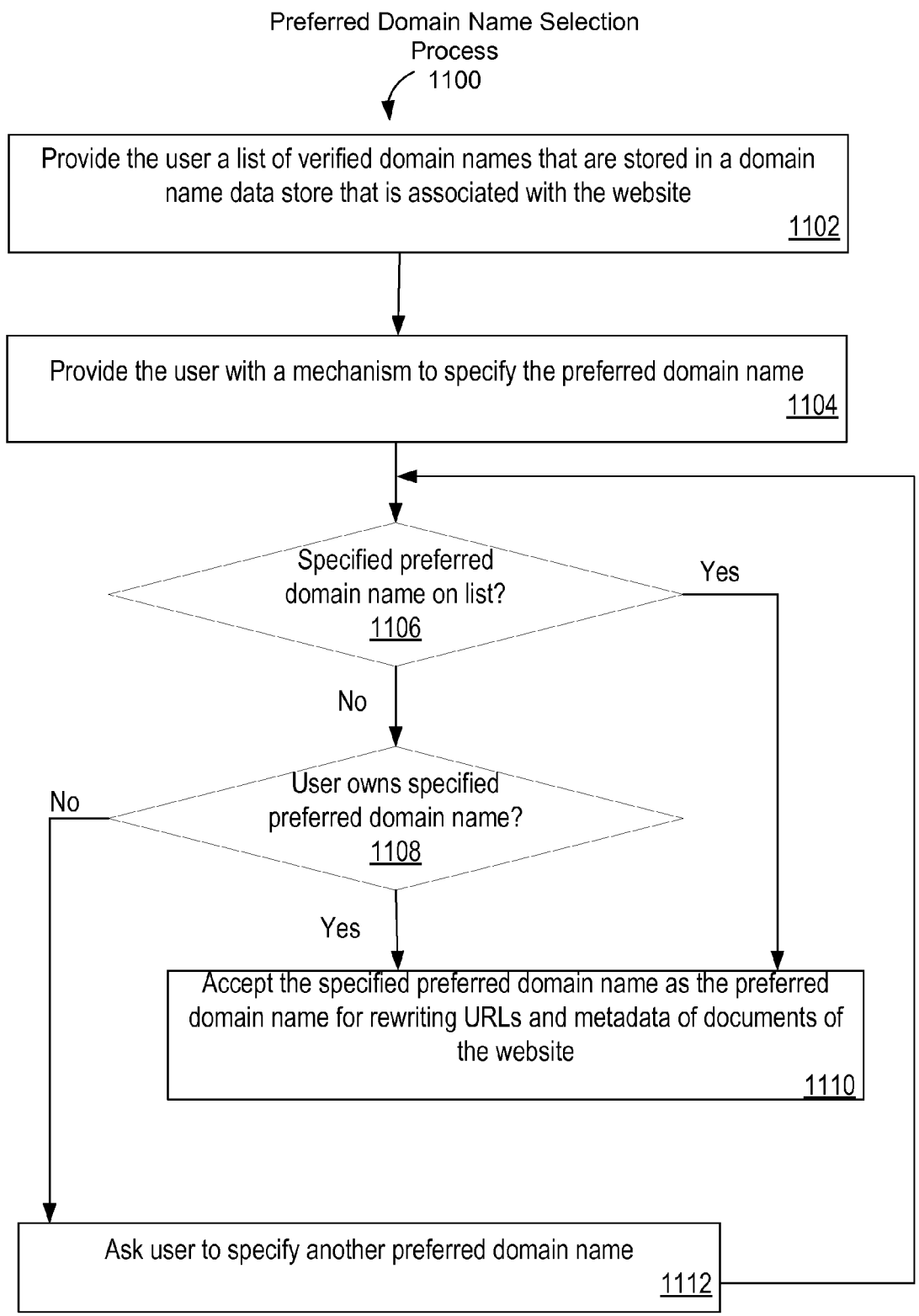
FIG. 11 is a flowchart illustrating a process for enabling a website owner to select a preferred domain name, according to some embodiments of the invention.

FIG. 11 is a flowchart illustrating a process for enabling a website owner to select a preferred domain name, according to some embodiments of the invention. A user is provided with a list of verified domain names that are stored in a domain name data store that is associated with the website (1102). The user is also provided with a mechanism, such as a user interface, to specify the preferred domain name (1104). If the domain specified by the user is from the list of verified domain names (1106—Yes), then the specified domain name is accepted as the preferred domain name for rewriting URLs and metadata of documents of the website (1110). If the specified domain name is not from the list of verified domain names (1106—No), then it is determined if the user owns the domain name specified by the user as the preferred domain name (1108). If it is determined that the user owns the domain name specified by the user (1108—Yes), then the user specified domain name is accepted as the preferred domain name for rewriting URLs and for generating metadata for documents of the website. If, however, it is determined that the user does not own the domain name specified by the user (1108—No), then the user is asked to specify another domain name (1112) and the process may resume at operation 1106.

According to certain embodiments, if the specified domain name is not from the list of verified domain names, then verification is performed on the specified domain name. Upon successful verification, the specified domain name is added to the list of verified domain names, and thus can be subsequently selected as a preferred domain name by using the process illustrated in FIG. 11, for example.

According to certain embodiments, the requests for preferred domain names by multiple users of a given website are analyzed to ensure that the requested domain name mappings do not result in chains and/or cycles as described herein with reference to FIG. 8. According to certain other embodiments, domain name mappings that result in chains are accepted by the system. For example, for the domain name mapping A→X, X→Y, the preferred domain name is Y.

Figure 12:
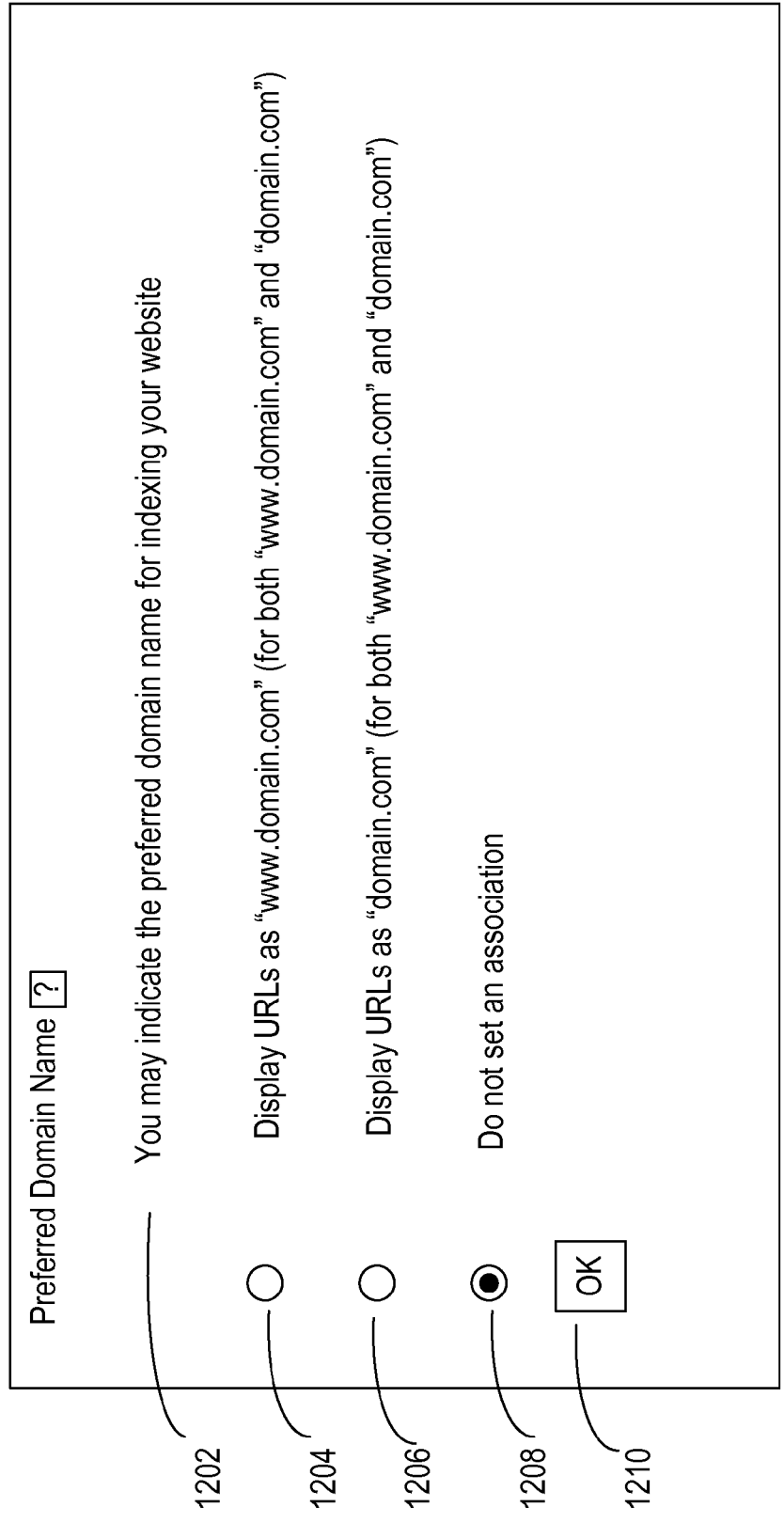
FIGS. 12, 13, and 14 are schematic illustrations of a GUI for managing domain names, according to some embodiments of the invention.

FIG. 12 illustrates a GUI 1200 for managing domain names for a specified website. According to certain embodiments, a graphical user interface such as GUI 1200 is presented to a user to show the user the equivalent domain names for a specified website and to enable the user to select a preferred domain name. GUI 1200 shows:

instructions 1202 for using GUI 1200;

selection button 1204 for selecting a first domain name as the preferred domain name. In this example, it is assumed that there are only two equivalent domain names for the specified website;

selection button 1206 for selecting a second domain name as the preferred domain name;

selection button 1208 for electing not to specify a preferred domain name; and selection button 1210 to activate the user's selection using GUI 1200.

GUI 1200 only shows two equivalent domain names for a specified website. However, it is understood by one skilled in the art, that a specified website may have a two or more equivalent domain names.

Figure 13:
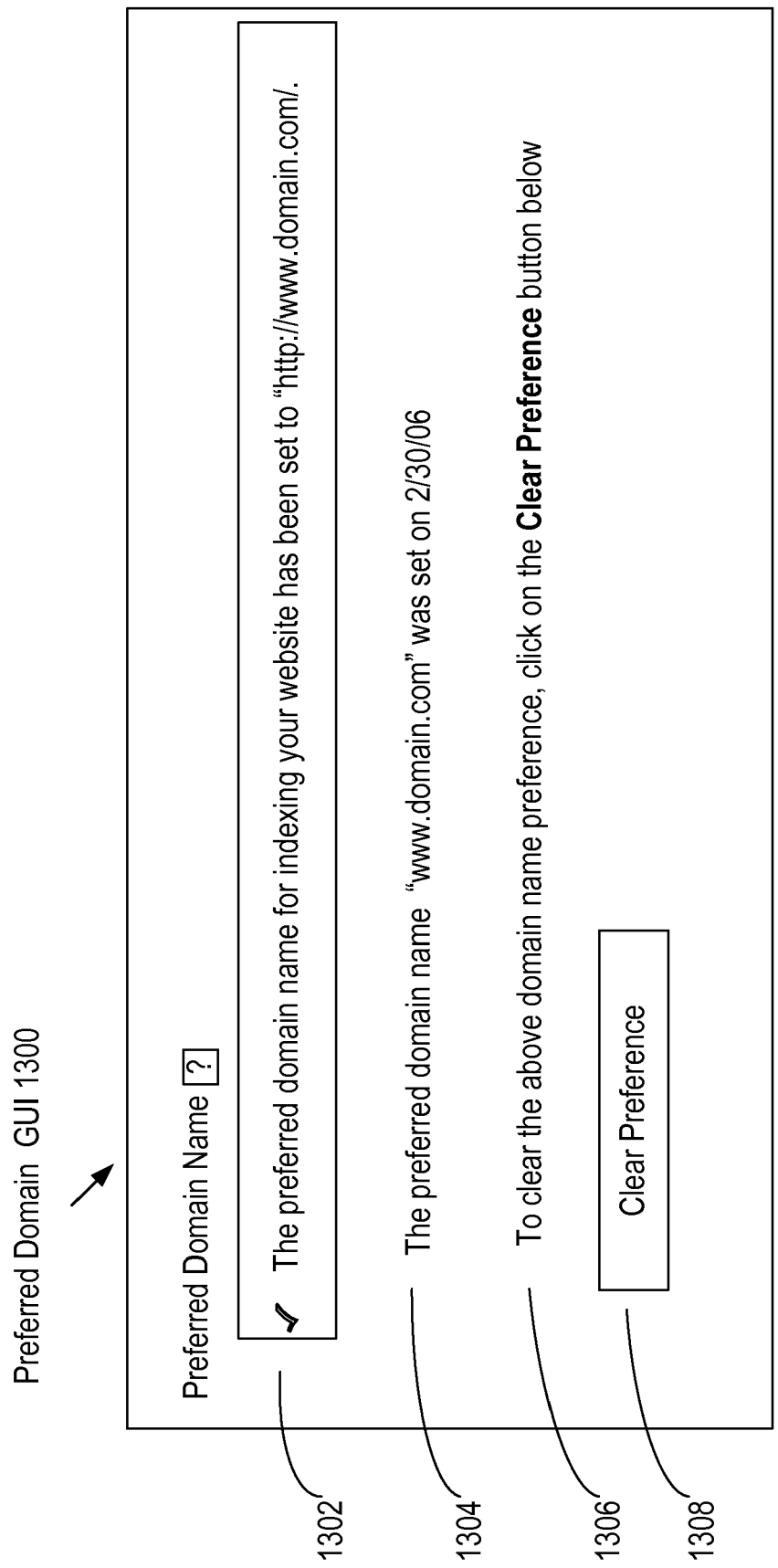

FIG. 13 shows a GUI 1300 that also is associated with managing domain names for a specified website. Upon activating the user's selection of a preferred domain name as described with reference to FIG. 12 herein, GUI 1300 shows confirmation information 1302 of the preferred domain name selected by the user. GUI 1300 may optionally include additional information 1304 such as a date when the preferred domain name was set. Further, GUI 1300 provides instructions 1306 for clearing the current domain name preference by selecting button 1308 to clear the preference.

Figure 14:
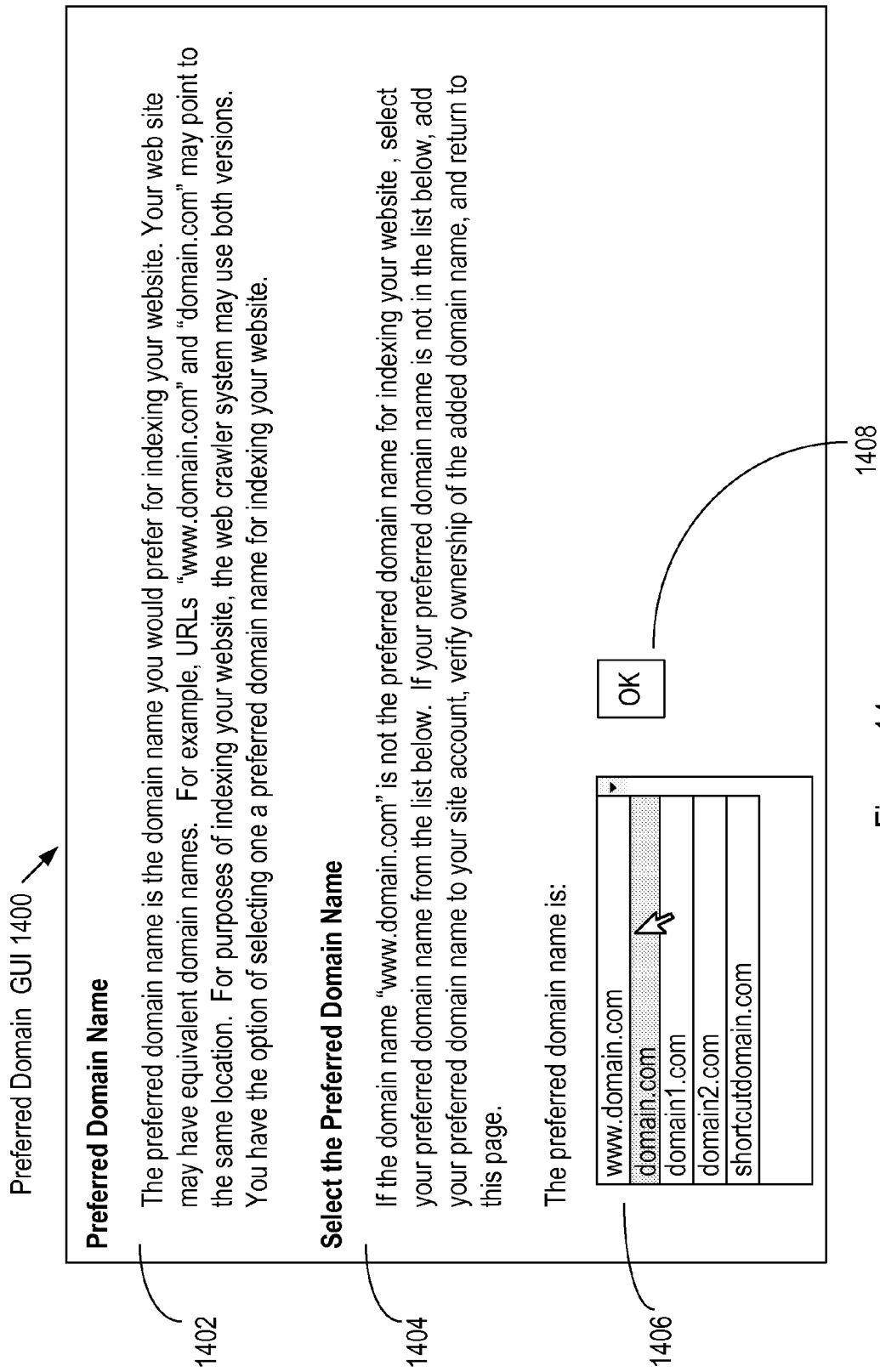

FIG. 14 illustrates another non-limiting example of a preferred domain name GUI 1400. GUI 1400 shows domain name information 1402 explaining the role of a preferred domain name in the context of indexing a specified website. GUI 1400 also shows instructions 1404 for selecting a preferred domain name. Further, GUI 1400 provides a pull down list 1406 that lists a plurality of domain names associated with the specified website. A user can select a preferred domain name from list 1402 and then select the "ok" button 1408 to activate the selection. According to certain embodiments, the preferred domain name specified by the user is stored in a domain name database, such as domain name database 800 as described herein. For example, the preferred domain name selected by the user using either GUI 1300 or GUI 1400 may be stored as preferred domain name 808 for a specified website record 802. Further, once the preferred domain name is selected, the respective domain name preference record 806 of domain name database 800 is modified to store the mapping information for mapping a respective equivalent domain name to the specified preferred domain name in domain name mapping 810.

According to certain embodiments, a user may be verified as a valid owner of the website. A specified website may have one or more verified owners. A verified owner of a website may select a preferred domain name for the website in a manner as previously described herein. Further, a verified owner may perform other functions such as controlling a crawl rate for the website as described in greater detail herein with reference to FIGS. 21 through 25. Verification of website ownership is described in greater detail with reference to FIGS. 15 through 20, herein.

For a respective user, the system stores information such as the various websites for which the user is verified as an owner, the time when the verification occurred, and the manner by which the user was verified. FIG. 15 is a block diagram illustrating a registered owner database 1500, according to some embodiments of the invention. The registered owner database 1500 includes one or more user records 1502. According to certain embodiments, a respective user record 1502 includes user information 1504, and one or more site records 1506. In some embodiments, a respective site record 1506 includes the site URL 1508, a location 1510 of the verification tag and/or the verification file, a timestamp 1512 associated with the verification of the user, the verification status 1514 of the user, and optionally, additional information. Site URL 1508 is the URL of the website for which the user is verified as one of the owners.

According to certain embodiments, the system provides a verification tag and/or a verification file that website owners can store on their respective websites. If a verification tag is used, the verification tag may be stored, for example, in a header of the home page of the website. Alternately, the verification tag may be stored in the website in a file having a predefined name (e.g., robots.txt or any other suitable file name). If a verification file is used, the verification file may be stored in the website.

According to some embodiments, each verification tag and/or verification file is specific to a respective owner. For example, in some embodiments, the verification tag for a respective website owner may include a verification value that is generated by (or on behalf of) the search engine and that is unique to the website owner. In one example, the verification value is produced by applying a one-way hash function to a name of the website owner concatenated with a seed value or other value. By maintaining secrecy with respect to the one-way hash function and/or the seed value or other value, attempts to generate non-authentic verification tags may be thwarted. In embodiments that use a verification file for verifying a respective website owner, the aforementioned verification value may be used as the name (or as a portion of the name) of the verification file.

Further, in some embodiments, the content of a verification tag or the name of a verification file may be produced in a manner that is transparent to the user and yet still secure. For example, the content of the verification tag or the name of the verification file can be digitally signed in a secure manner, using any appropriate digital signature methodology. The use of digital signature enables the verification tag or verification file to be authenticated by other users, including the search engine. Alternately, the content of the verification tag or the name of the verification file can be encrypted using public-private key encryption, which also allows authentication of the verification tag or verification file.

According to some embodiments, for a specified website that the system is crawling, the system stores information such as a list of users that are verified as owners of the specified website, the time when the verification occurred, and the manner by which each user was verified for the specified website. FIG. 16 is a block diagram illustrating a site owner verification database 1600, according to some embodiments of the invention. The site owner verification database 1600 includes one or more site records 1602. A respective site record 1602 corresponds to a respective website that the system may crawl. In some embodiments, a site record 1602 includes site URL 1604, and one or more user records 1606. Site URL 1604 is the URL associated with the respective website. User record 1606 includes a user identification such as user name or user ID 1608, a location 1610 of the verification tag and/or the verification file, a timestamp 1612 associated with the verification of the user, the verification status 1614 of the user, and optionally, additional information.

Figure 17:
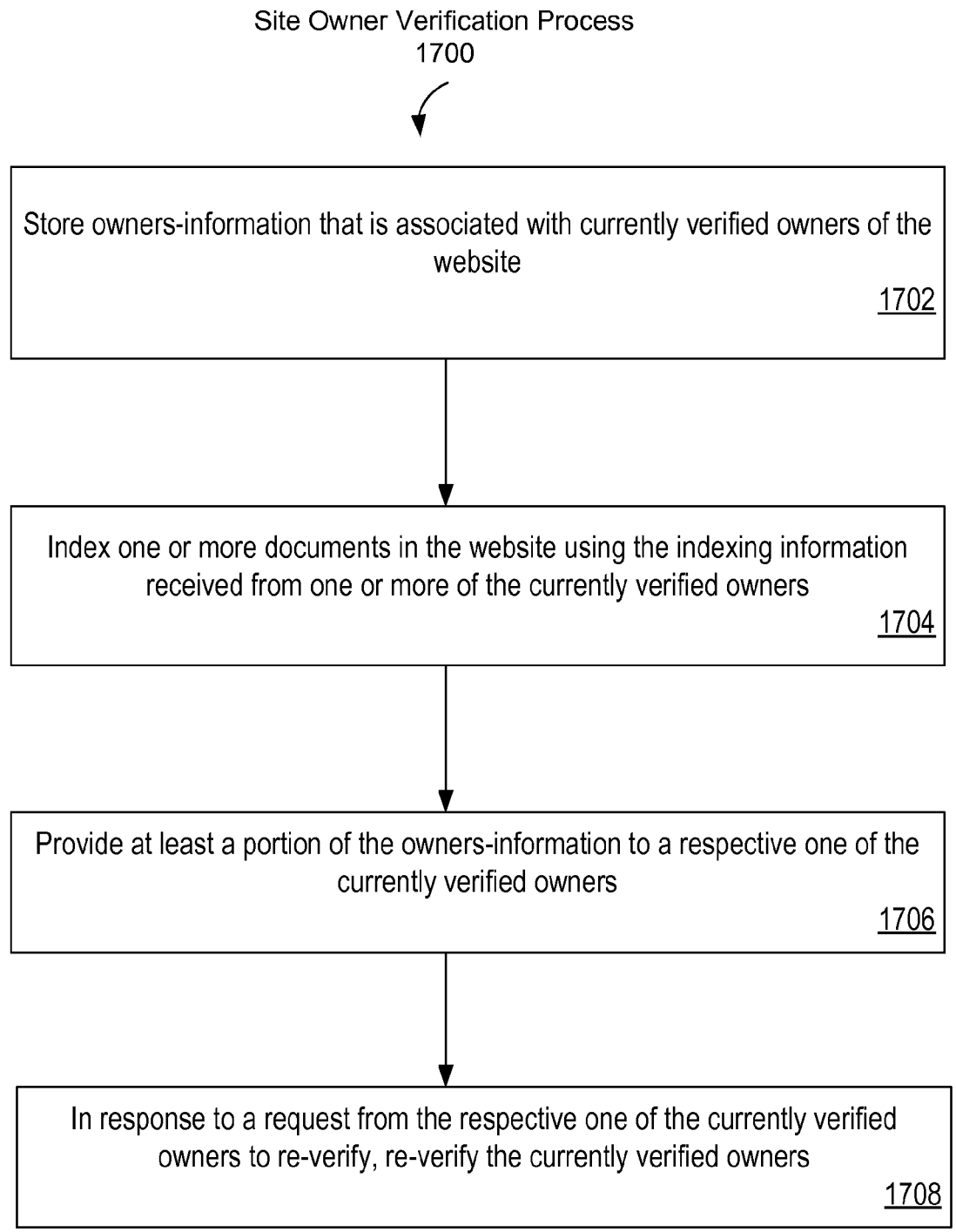
FIGS. 17 and 18 are flowcharts illustrating a process for verifying website ownership, according to some embodiments of the invention.

FIG. 17 is a flowchart illustrating a process for verifying ownership rights of a website, according to some embodiments of the invention. Owners-information that is associated with currently verified owners of the website is stored (1702). As a non-limiting example, owners-information may include a list of verification tags and/or verification files associated with each of the respective owners of the website. The list of verification tags and/or verification files may be stored either in verification tag/file location 1510 or 1610 of FIGS. 15 and 16 respectively, for example. One or more documents in the website are indexed using the indexing information received from one or more of the currently verified owners of the website (1704). At least a portion of the owners-information is provided to a respective one of the currently verified owners (1706). In response to a request from the respective one of the currently verified owners, the currently verified owners are re-verified (1708). Such a re-verification includes revoking the ownership rights of previously verified owners whose ownership rights have expired or terminated. In particular, if the verification tag or verification file of a "currently" verified owner (i.e., a previously verified owner) is not found by the server performing the verification process 1700, then the ownership rights of that owner are revoked, for example by marking the verification status 1514 (or 1614) of the user as "unverified". Typically, the verification tag or verification file of the previously verified owner would not be found because the verification tag or verification file has been deleted from the website.

Figure 18:
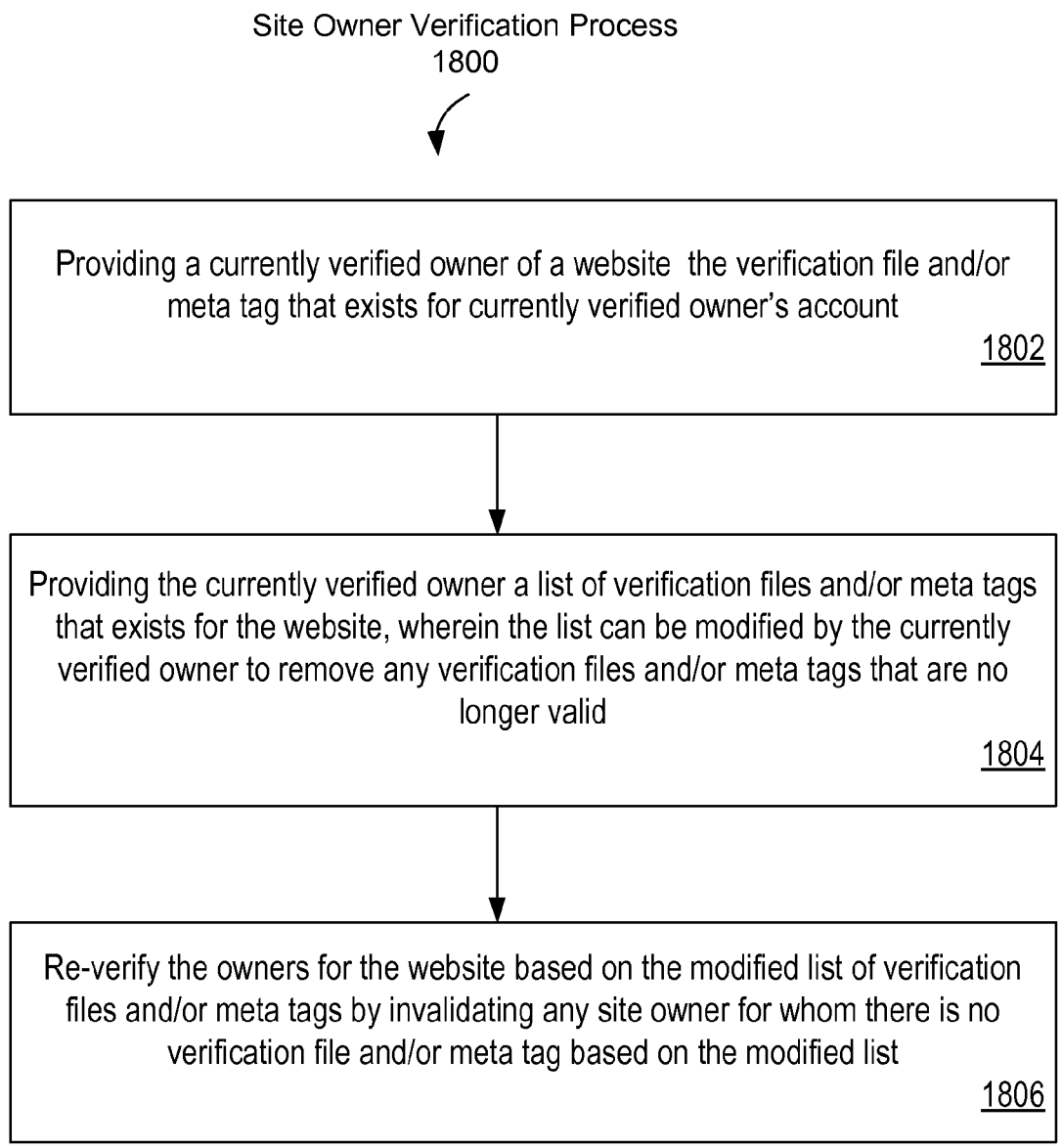

FIG. 18 is a flowchart illustrating further details of the process for verifying ownership rights such as details associated with providing at least a portion of the owners-information to a respective one of the currently verified owners. The respective one of the currently verified owners is provided with the verification file and/or meta tag that exists for her account (1802). In other words, the respective one of the currently verified owners is provided with the owner-specific verification file and/or meta tag that is specific to her. Further, the respective one of the currently verified owners is provided with a complete list of verification files and/or meta tags that exist for the specified website (1804). The list includes verification files and/or meta tags that correspond to other currently verified owners of the specified website. The respective one of the currently verified owners can modify the list of verification files and/or meta tags to remove those verification files and/or meta tags that correspond to owners whose ownership rights have expired or terminated. The respective one of the currently verified owners can then request re-verification of owners based on the modified list of verification files and/or meta tags. The owners are re-verified and site owners for whom there is no verification file and/or meta tag are invalidated (1806).

Some non-limiting examples of mechanisms for enabling a user to revoke ownership rights and request re-verification of ownership rights regarding a website include a user interface, meta-tags stored at the website, and information stored in a predefined file stored in the website (e.g., a robots.txt file). As another non-limiting example, a predetermined protocol may be used to request re-verification of ownership rights regarding a website.

For purposes of explanation, assume that multiple webmasters M1, M2 and M3 have been verified previously as legitimate owners of a website W. Further assume that the ownership rights of M1 and M3 are terminated, subsequently. Search engines that are scheduled to crawl website W may be effectively notified of such termination of ownership rights by the re-verification process as described herein. As a non-limiting example, webmaster M2 is provided, through an appropriate user interface, with a list of verification tags and/or verification files that currently exist for website W. Also, webmaster M2 is informed of the verification tag and/or verification file that is specific to webmaster M2. Webmaster M2 can use the user interface to remove verification tags and/or verification files that are no longer valid. After removal of the verification tags and/or verification files that are no longer valid, webmaster M2 can then request, through the user interface for example, a re-verification of the owners of the website W based on the updated list of verification tags and/or verification files.

According to certain embodiments, the system can periodically check the list of verification tags and/or verification files for updates without waiting for a website owner to request re-verification.

Figure 19:
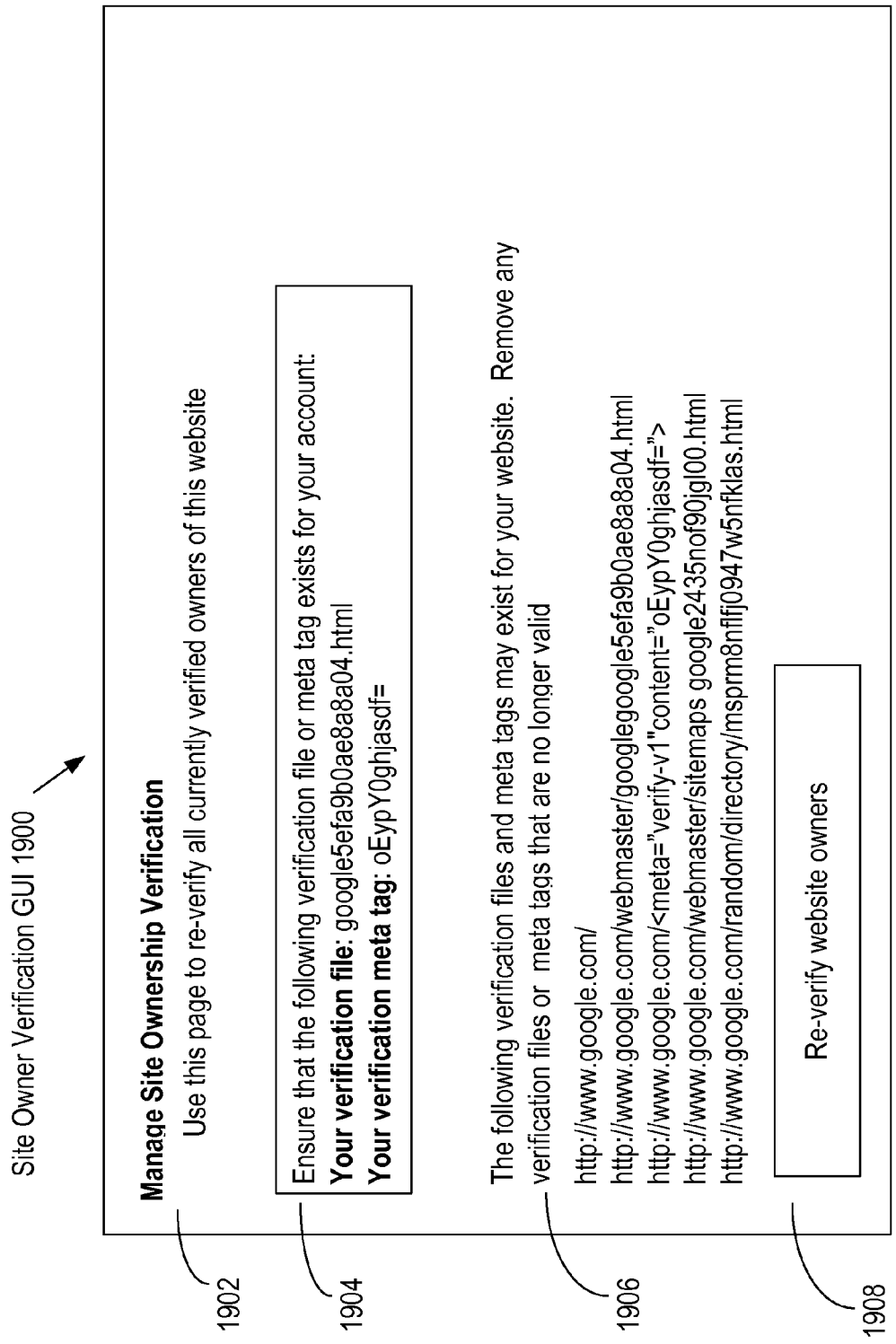

FIGS. 19 and 20 illustrate a non-limiting example of a GUI for enabling a website owner to manage site ownership verification. Site owner verification GUI 1900 of FIG. 19 includes information 1902 describing the use of the GUI for performing re-verification of website owners for a specified website, identification 1904 of one or more verification files and/or meta tags that are specific to a respective website owner who is using GUI 1900, a list 1906 of verification files and/or meta tags that exist for the specified website, and a re-verification button 1908. The website owner (also referred to as the "re-verifier") who is attempting to perform the re-verification operation can edit list 1906 to remove verification files and/or meta tags that are no longer valid. Identification 1904 of the one or more verification files and/or meta tags that are specific to the re-verifier helps avoid the inadvertent removal of the re-verifier's own verification files and/or meta tags during the re-verification process. When the re-verifier is satisfied that the invalid verification files and/or meta tags have been removed from list 1906, the re-verifier can activate the re-verification process by selecting re-verification button 1908. According to certain embodiments, upon re-verification, the re-verifier is shown GUI 2000 of FIG. 20. GUI 2000 includes re-verification information 2002, identification 2004 of one or more verification files and/or meta tags that are specific to the re-verifier, a list 2006 of verification and/or meta tags that exist for the specified website, and a re-verification button 2008. Re-verification information 2002 informs the re-verifier that the specified website has been re-verified, and may include information stating that: 1) site owners for whom a corresponding verification file and/or meta tag was not found are no longer verified for the specified website, and 2) site owners for whom a corresponding verification file and/or meta tag was found remain verified for the specified website. Identification 2004 of one or more verification files and/or meta tags that are specific to the re-verifier reminds the re-verifier of his or her verification files and/or meta tags to help the re-verifier review list 2006. In reviewing list 2006, if the re-verifier is satisfied that only valid site owners remain verified, then no further action is required of the re-verifier and the re-verifier may exit GUI 2000. If, however, the re-verifier finds that some invalid site owners remain verified, the re-verifier may once again edit list 2006. After editing list 2006, the re-verifier can re-activate the re-verification process by selecting re-verification button 2008.

According to certain embodiments, a site owner for a specified website may control the rate at which crawlers or crawl robots crawl the specified website. In some embodiments, the control of the crawl rate may be restricted to verified owners of the root domain of the website in order to limit the ability of sub-domain and virtual hosting site owners to affect the portion of the website's bandwidth used by web crawlers. FIG. 21 illustrates a crawl rate database 2100 used in controlling crawl rate, according to certain embodiments. As a non-limiting example, per site information database 740 of FIG. 7 may include crawl rate database 2100. Crawl rate database 2100 includes site crawl records 2102. Site crawl record 2102 includes site URL 2104, crawl rate limit 2106, crawl data 2108, a list of record pointers 2110, past utilization value 2112, and optionally, additional elements. Site URL 2104 stores the URL of the specified website. Crawl rate limit 2106 stores the crawl rate limit that either was originally pre-set by the web crawler system or that was subsequently specified by one of the owners of the specified website. For example, with the help of a crawl rate control module such as crawl rate control module of FIG. 7, an owner of the website may specify a crawl rate limit at which crawl robots 708 may crawl the specified website As described in greater detail with reference to FIGS. 23, 24 and 25, the owner may or may not be allowed to increase the crawl rate limit depending on whether crawl rate limit is a factor in the crawling of the specified website. According to certain embodiments, crawl data 2108 includes statistical data 2122 on the number of web pages or documents accessed by the crawl robots at the specified website during a crawl session, statistical data 2124 on the time expended by the crawl robots on each access, and statistical data 2126 on the number bytes downloaded during the crawl session. List of log record pointers 2110 point to log records 2120 that include information related to accessing the web pages or documents during a crawl session. According to certain embodiments, the statistical data such as statistical data 2122, 2124 and 2126 are based on information stored in log records 2120. There may be numerous log records corresponding to crawl data captured over a period of time. Past utilization value 2112 is the highest crawl rate that occurred for the specified website over a pre-set period of time. In one embodiment, the pre-set period of time corresponds to a pre-set number of the most recent crawls of the specified website (e.g., the last 5 to 10 most recent crawls of the specified website). According to certain embodiments, the past utilization value 2112 may the maximum number of pages accessed during a crawl session. Statistical data such as statistical data 2122, 2124 and 2126 and past utilization information such as past utilization value 2112 may be presented to an owner of the specified website through an appropriate user interface to aid in crawl rate control, as described in greater detail herein with reference to FIGS. 24 and 25.

Figure 22:
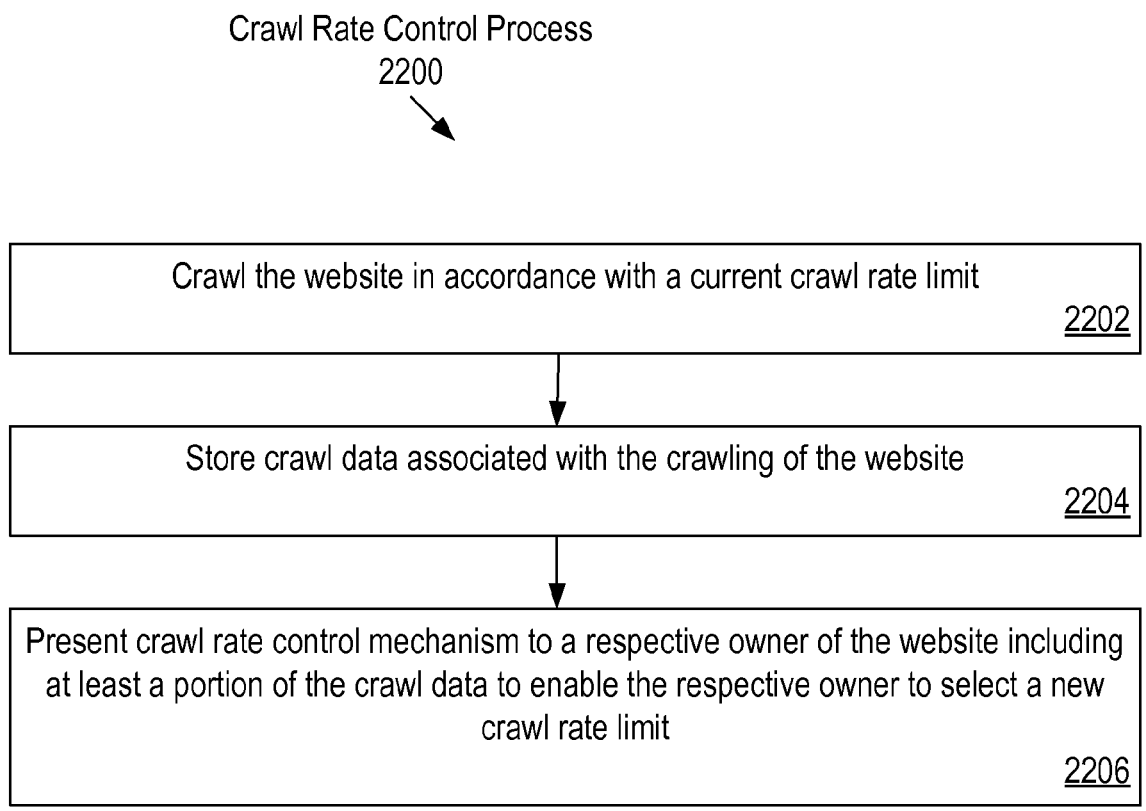
FIGS. 22 and 23 are flowcharts illustrating a process for controlling crawl rate, according to some embodiments.

FIG. 22 is a flowchart that describes a crawl rate control process 2200, according to certain embodiments. The specified website is crawled in accordance with a current rate limit (2202). For example, the current crawl rate limit may be a limit that is initially set by the website server, such as website server 200, for the specified website and subsequently re-set by an owner of the specified website. As previously described, crawl rate limit may be stored at crawl rate limit 2106 in crawl rate database 2100 of FIG. 21. Crawl data associated with the crawling of the website is stored (2204). For example, crawl data is stored in crawl data 2108 in crawl rate database 2100. A crawl rate control mechanism is presented to a respective owner of the specified website including at least a portion of the crawl data to enable the respective owner to select a new crawl rate limit (2206).

Figure 23:
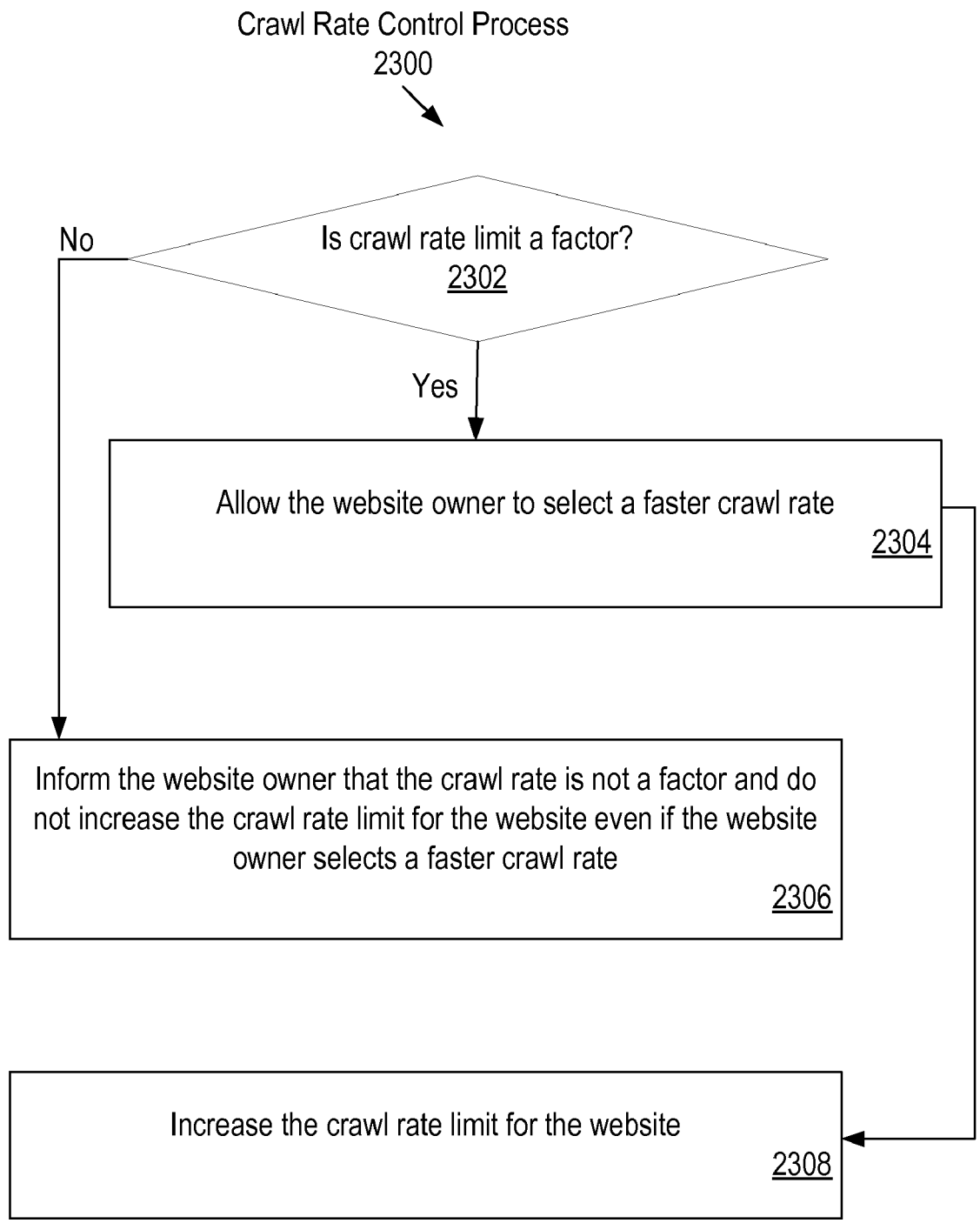

FIG. 23 is a flowchart that illustrates further details of crawl rate control as shown in crawl rate control process 2300. According to certain embodiments, the crawl rate control process includes determining if the crawl rate limit is a factor in crawling the specified website (2302). For example, crawl rate limit is a factor if the maximum number of documents (past utilization value) accessed simultaneously by the crawl robots during a crawl session would be increased but for the crawl rate limit. In another example, the crawl rate limit is a factor if the difference between the current crawl rate limit and the past utilization value 2112 (or a corresponding rate value) is less than a predefined percentage (e.g., ten percent) of the current crawl rate limit. If crawl rate limit is a factor (2302—Yes), the website owner is allowed to select a faster crawl rate (2304), and as a result, the crawl rate limit for the specified website is increased (2308). If crawl rate limit is not a factor (2302—No), the website owner is informed that crawl rate limit is not a factor. According to certain embodiments, when crawl rate limit is not a factor, the website owner is not given an option to increase the crawl rate. According to certain other embodiments, when crawl rate limit is not a factor, the crawl rate limit is not increased despite the selection of a faster crawl rate by the website owner. In such a case, the website owner is informed that no change is made to the crawl rate limit. According to certain embodiments, the website owner can always choose a slower crawl rate. According to some embodiments, the change in crawl rate (either an increment or decrement in the crawl rate) as specified by the website owner may be applied immediately, including in the middle of a crawl session. In other embodiments, the change in crawl rate is applied during the next crawl session.

Figure 24:
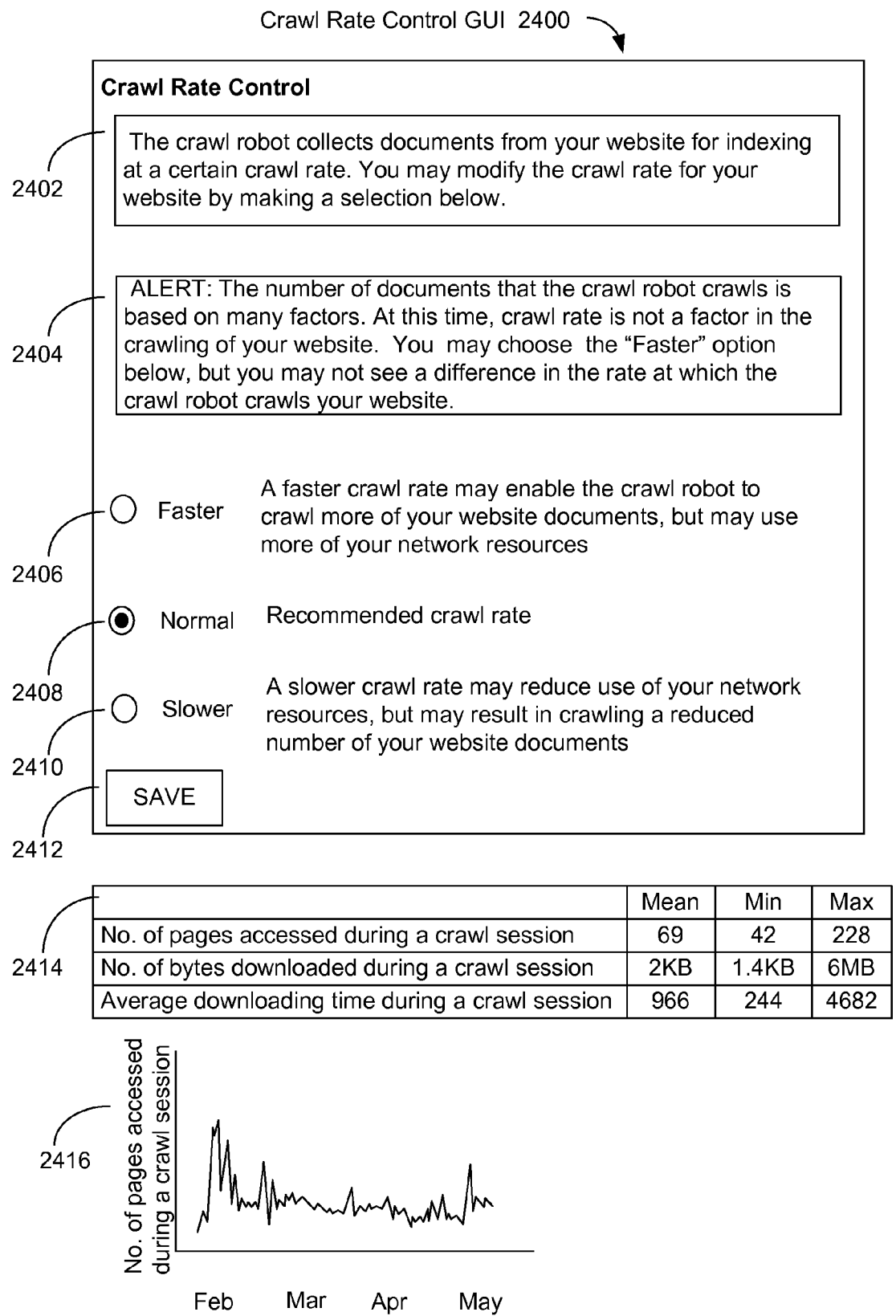
FIGS. 24 and 25 are schematic illustrations of a GUI for controlling crawl rate, according to some embodiments.

FIG. 24 is a schematic illustration of a crawl rate control GUI 2400 according to certain embodiments. GUI 2400 illustrates the case when crawl rate limit is not a factor in crawling the specified website. Crawl rate control GUI 2400 includes help information 2402 that describes the function of crawl rate in the context of collecting of documents from the specified website for purposes of indexing, for example. GUI 2400 also includes information 2404 to inform the website owner that crawl rate limit is not a factor in crawling the specified website. GUI 2400 further includes selection buttons such as a "faster" button 2406 for requesting a faster crawl rate if the website owner is allowed to select a faster crawl rate, a "normal" button 2408 which is a recommended crawl rate, a "slower" button 2410 for requesting a slower crawl rate, and a "save" button 2412 to save the website owner's selection of crawl rate. GUI 2400 includes the presentation of a table 2414 and a graph 2416 of statistical data. For example, statistical data such as statistical data 2122, 2124 and 2126 based on information stored in log records 2120 of FIG. 21 may be used to present data in table 2414 and graph 2416. As a non-limiting example, graph 2416 shows the number of pages or documents accessed during a crawl session over a period of several months for the specified website. In some embodiments, projected statistical data is presented to the website owner based on the new crawl rate selected by the website owner. For example, projected statistical data includes expected bandwidth usage and/or expected number of pages or documents that may be crawled using the new crawl rate. In some embodiments, such projections may be estimated by revising recent statistical data referenced in FIG. 24 in a manner proportional to the specified change in crawl rate for the specified website.

Figure 25:
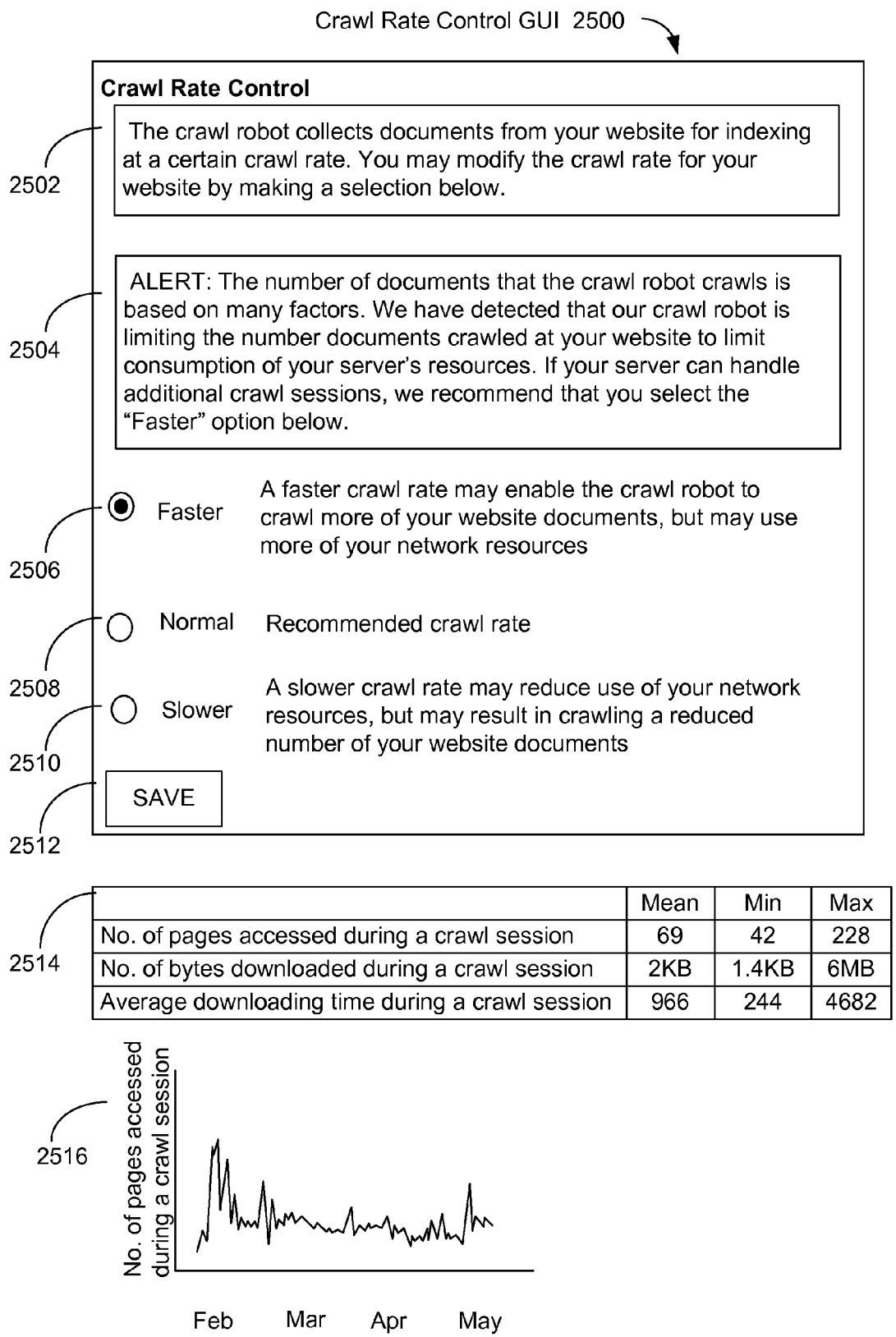

Similarly, FIG. 25 is a schematic illustration of a crawl rate control GUI 2500, according to certain embodiments. GUI 2500 illustrates the case when crawl rate limit is a factor in crawling the specified website. Crawl rate control GUI 2500 includes help information 2502 that describes the function of crawl rate in the context of collecting of documents from the specified website for purposes of indexing, for example. GUI 2500 also includes information 2504 to inform the website owner that the website owner may choose a faster crawl rate, if so desired. GUI 2400 further includes selection buttons such as a "faster" button 2506 for requesting a faster crawl rate, a "normal" button 2508 which is a recommended crawl rate, a "slower" button 2510 for requesting a slower crawl rate, and a "save" button 2512 to save the website owner's selection of crawl rate. GUI 2500 includes the presentation of a table 2514 and a graph 2516 of statistical data collected during a crawl session over a set period of time, for example.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A computer-implemented method of indexing a plurality of documents in a website, the computer-implemented method comprising:
   at a web crawler:
   associating a plurality of domain names with the website, the plurality of domain names including a preferred domain name;
   for a document in the website having a specified locator with a domain name other than the preferred domain name, rewriting the specified locator to a rewritten locator that includes the preferred domain name; and
   indexing the document using the rewritten locator.

2. The computer-implemented method of claim 1, further including generating metadata for the document using the rewritten locator.

3. The computer-implemented method of claim 2, wherein generating the metadata comprises generating a document importance value.

4. The computer-implemented method of claim 1, wherein the indexing includes storing data that maps a plurality of terms in the document to the rewritten locator.

5. The computer-implemented method of claim 1, wherein associating the plurality of domain names with the website further comprises:
   providing a list of verified domain names previously added to a site account associated with the website;
   providing a mechanism for specifying the preferred domain name by a user; and
   if the specified preferred domain name is not on the list, verifying that the user has ownership of the specified preferred domain name.

6. The computer-implemented method of claim 5, further comprising verifying that the user is a site owner of the website.

7. The computer-implemented method of claim 1, further comprising identifying the preferred domain name before indexing the documents of the website.

8. The computer-implemented method of claim 1, further comprising:

if the document is associated with a set of multiple locators, wherein the set includes a conforming locator that is in conformance with the preferred domain name, selecting the conforming locator for indexing the document.

9. The computer-implemented method of claim 1, wherein associating the plurality of domain names with the website further comprises:
providing a mechanism for adding domain names associated with the website for verification; and
when the added domain names are verified, including the added domain names in a list of verified domain names associated with the website.

10. The computer-implemented method of claim 1, further comprising determining that content associated with a first domain name of the plurality of domain names is identical to corresponding content associated with a second domain name of the plurality of domain names.

11. A computer-implemented method of indexing a plurality of documents in a website, the computer-implemented method comprising:
providing to a user a current preferred domain name that is associated with the website;
providing to the user a list of domain names associated with the website;
accepting a user selection of a new preferred domain name from the list of domain names; and
rewriting a specified locator for a document in the website, the specified locator having a domain name in the list of domain names other than the new preferred domain name, to a rewritten locator that includes the new preferred domain name.

12. The computer-implemented method of claim 11, further comprising:
providing to the user a user interface for adding domain names associated with the website for verification; and
when added domain names are verified, including the added domain names in the list of domain names, for display to the user.

13. A non-transitory computer readable storage medium storing one or more programs for execution by one or more processors of a computer system, the one or more programs comprising:
instructions for associating a plurality of domain names with the website, the plurality of domain names including a preferred domain name;
instructions for rewriting a specified locator for a document in the website, the specified locator having a domain name other than the preferred domain name, to a rewritten locator that includes the preferred domain name; and
instructions for indexing the document using the rewritten locator.

14. The computer readable storage medium of claim 13, the one or more programs further comprising instructions for generating metadata for the document using the rewritten locator.

15. The computer readable storage medium of claim 14, wherein the generated metadata includes a document importance value.

16. The computer readable storage medium of claim 13, wherein the instructions for indexing include instructions for storing data that maps a plurality of terms in the document to the rewritten locator.

17. The computer readable storage medium of claim 13, wherein the instructions for associating the plurality of domain names with the website further comprises:

instructions for providing a list of verified domain names previously added to a site account associated with the website;
instructions for providing a mechanism for specifying the preferred domain name by a user; and
instructions for verifying that the user has ownership of the specified preferred domain name when the specified preferred domain name is not on the list.

18. The computer readable storage medium of claim 17, the one or more programs further comprising instructions for verifying that the user is a site owner of the website.

19. The computer readable storage medium of claim 13, the one or more programs further comprising instructions for identifying the preferred domain name before indexing the documents of the website.

20. The computer readable storage medium of claim 13, the one or more programs further comprising:
instructions for selecting the conforming locator for indexing the document, when the document is associated with a set of multiple locators, wherein the set includes a conforming locator that is in conformance with the preferred domain name.

21. The computer readable storage medium of claim 13, wherein the instructions for associating the plurality of domain names with the website further comprise:
instructions for providing a mechanism for adding domain names associated with the website for verification; and
instructions for including the added domain names in a list of verified domain names associated with the website when the added domain names are verified.

22. The computer readable storage medium of claim 13, the one or more programs further comprising instructions for determining that content associated with a first domain name of the plurality of domain names is identical to corresponding content associated with a second domain name of the plurality of domain names.

23. A non-transitory computer readable storage medium storing one or more programs for execution by one or more processors of a computer system, the one or more programs comprising:
instructions for providing to a user a current preferred domain name that is associated with the website;
instructions for providing to the user a list of domain names associated with the website, wherein the user selects a new preferred domain name from the list of domain names;
instructions for accepting a user selection of a new preferred domain from the list of domain names; and
instructions for rewriting a specified locator for a document in the website, the specified locator having a domain name in the list of domain names other than the new preferred domain name, to a rewritten locator that includes the new preferred domain name.

24. The computer readable storage medium of claim 23, further comprising:
instructions for providing to the user a user interface for adding domain names associated with the website for verification; and
instructions for including the added domain names in the list of domain names when the added domain names are verified.

25. A computer system comprising:
one or more processors; and
a memory storing at least one program configured to be executed by the one or more processors, the at least one program comprising:

instructions for providing to a user a current preferred domain name that is associated with a website;
instructions for providing to the user a list of domain names associated with the website;
instructions for accepting a user selection of a new preferred domain from the list of domain names; and
instructions for rewriting a specified locator for a document in the website, the specified locator having a domain name in the list of domain names other than the new preferred domain name, to a rewritten locator that includes the new preferred domain name.

26. The computer system of claim 25, the at least one program further comprising:
instructions for providing to the user a user interface for adding domain names associated with the website for verification; and
instructions for including the added domain names in the list of domain names provided to the user when the added domain names are verified.

* * * * *